US010419080B2

(12) United States Patent
Liang et al.

(10) Patent No.: US 10,419,080 B2
(45) Date of Patent: Sep. 17, 2019

(54) CELLULAR WIRELESS COMMUNICATION SYSTEMS ENHANCED BY INTELLIGENT SELF-ORGANIZING WIRELESS DISTRIBUTED ACTIVE ANTENNAS

(71) Applicant: Ping Liang, Irvine, CA (US)

(72) Inventors: Ping Liang, Newport Coast, CA (US); Dengkui Zhu, Beijing (CN)

(73) Assignee: RF DSP INC., Irvine, CA (US)

( * ) Notice: Subject to any disclaimer, the term of this patent is extended or adjusted under 35 U.S.C. 154(b) by 0 days.

(21) Appl. No.: 16/073,330

(22) PCT Filed: Jan. 28, 2017

(86) PCT No.: PCT/US2017/015518
§ 371 (c)(1),
(2) Date: Jul. 26, 2018

(87) PCT Pub. No.: WO2017/132629
PCT Pub. Date: Aug. 3, 2017

(65) Prior Publication Data
US 2018/0351605 A1 Dec. 6, 2018

Related U.S. Application Data

(60) Provisional application No. 62/287,521, filed on Jan. 27, 2016.

(51) Int. Cl.
*H04B 7/024* (2017.01)
*H04B 7/0452* (2017.01)
(Continued)

(52) U.S. Cl.
CPC .......... *H04B 7/024* (2013.01); *H04B 7/0417* (2013.01); *H04B 7/0452* (2013.01); *H04B 7/0617* (2013.01); *H04B 17/318* (2015.01)

(58) Field of Classification Search
CPC ..................................... H04B 7/024
See application file for complete search history.

(56) References Cited

U.S. PATENT DOCUMENTS 8,064,380 B2 * 11/2011 Bims .................... H04L 1/16
370/315
9,369,161 B1 * 6/2016 Chukka ................ H04B 1/0475
(Continued)

FOREIGN PATENT DOCUMENTS

WO 2014007707 A1 1/2014

OTHER PUBLICATIONS

Adnan M. Caulfield; Eric S. Chung; Andrew Putnam; Hari Angepat; Jeremy Fowers; Michael Haselman; Stephen Heil; Matt Humphrey; Puneet Kaur; Joo-Young Kim; Daniel Lo; Todd Massengill; Kalin Ovtcharov; Michael Papamichael; Lisa Woods; Sitaram Lanka; Derek Chiou; Doug Burger. A Cloud-Scale Acceleration Architecture, Proceedings of the 49th Annual IEEE/ACM International Symposium on Microarchitecture, 2016.
(Continued)

*Primary Examiner* — John D Blanton
(74) *Attorney, Agent, or Firm* — Guosheng Wang; United States Research and Patent Firm

(57) ABSTRACT

This invention presents Capacity Projectors (CaPs) for intelligent control and management that collect information on channel conditions, actual and/or predicted demand for connectivity, data throughput and its distribution for a first time period in the future using signaling and control messages, analyze the collected information to identify the configurations of the BSs and CaPs that are needed to produce desired MU-MIMO communication channels in the first time period to meet the connectivity and data throughput demand and its distribution in the first time period, and adaptively control and configure the CaPs to actively shape the MU-MIMO communication channels to meet the pre-
(Continued)

dicted demand and its distribution, wherein controlling and configuring the CaP comprises implementing which of the CaPs to switch to sleeping mode or work mode and adjusting one or more of transmitting power gain, antenna tilt, beam direction and/or pattern of the transmitter and/or receiver, filtering of the receiving and/or transmitting signal.

20 Claims, 18 Drawing Sheets

(51) Int. Cl.
*H04B 7/0417* (2017.01)
*H04B 17/318* (2015.01)
*H04B 7/06* (2006.01)

(56) References Cited

U.S. PATENT DOCUMENTS

| | | | |
|---|---|---|---|
| 9,917,628 B2 | 3/2018 | Liang | |
| 2013/0203425 A1* | 8/2013 | De Domenico | H04W 16/32 455/449 |
| 2014/0376517 A1* | 12/2014 | Geirhofer | H04W 36/30 370/332 |
| 2015/0189586 A1 | 7/2015 | Westberg et al. | |
| 2015/0195015 A1 | 7/2015 | Kim et al. | |
| 2016/0219454 A1* | 7/2016 | Sawai | H04W 16/32 |
| 2017/0150317 A1* | 5/2017 | Iun | H04W 64/00 |

OTHER PUBLICATIONS

Search Report and Written Opinion of the ISA, PCT/US17/15518, WO 20171132629, dated Apr. 10, 2017.

* cited by examiner (a) No load balance (b) Load balance (a) No load balance (b) load balance (a) No load balance (a) Normal Status (b) Joint processing

CELLULAR WIRELESS COMMUNICATION SYSTEMS ENHANCED BY INTELLIGENT SELF-ORGANIZING WIRELESS DISTRIBUTED ACTIVE ANTENNAS

This application claims the benefit of U.S. Provisional Application No. 62/287,521, filed on Jan. 27, 2016.

FIELD OF INVENTION

This invention relates generally to cellular wireless communications systems, and more particularly, to enhancing Multiple-Input Multiple-Output (MIMO) cellular wireless communications systems using intelligent control and self-organization of distributed Capacity Projectors.

BACKGROUND

To meet the continued fast growing demand of mobile data, the wireless industry needs solutions that can provide very high data rates in a coverage area to multiple users simultaneously including at cell edges at reasonable cost. Currently, the wireless telecom industry is focused on dense deployment of small cells, the so called ultra-dense networks, to increase spatial reuse of wireless spectrum as the solution for meeting the growing mobile data demand. Dense deployment of small cells requires a large number of backhauls and creates complex inter-cell interference. One solution to the interference problem is to require careful Radio Frequency (RF) measurement and planning and inter-cell coordination, which significantly increases the cost of deployment and reduces the spectral efficiency. Another solution is the Self-Organizing Network (SON) technology, which senses the RF environments, configures the small cells accordingly through interference and transmit (Tx) power management, coordinated transmission and handover. SON reduces the need for careful RF measurement and planning at the cost of increased management overhead and reduced spectral efficiency. The backhaul network to support a large number of small cells is expensive to be laid out.

Another method for increasing spatial re-use of wireless spectrum is MIMO, especially Multi-User MIMO (MU-MIMO). In a wireless communication system, a wireless node with multiple antennas, a Base Station (BS) or a User Equipment (UE), can use beamforming in downlink (DL) or uplink (UL) to increase the Signal-to-Noise Ratio (SNR) or Signal-to-Interference-plus-Noise Ratio (SINR), hence the data rate. MU-MIMO can beamform to multiple UEs simultaneously in a frequency and time block, e.g., a Resource Block (RB), i.e., using spatial multiplexing to provide capacity growth without the need of increasing the bandwidth. Although a MIMO BS with a large number of antennas can extend its DL coverage range through beamforming, the SINR of UEs can decay quickly as the distance between the BS and a UE increases, because UEs far away from the BS have significantly lower SINRs than UEs close to the BS due to large-scale fading, shadowing, and other factors. In addition, the UL range, and hence the UL channel estimation accuracy, is limited by the transmitting power of UEs. Before the BS knows the channels of the UEs, it is unable to perform beamforming. Because of the above disadvantages, the large-scale antenna systems still face the non-uniformity in the coverage of a BS, which degrades users' experience and cannot satisfy the requirement of the next generation network.

Our provisional patent application (PPA) 62/104,086 filed on Jan. 16, 2015 titled "Beamforming in a MU-MIMO Wireless Communication System With Relays" presented inventions using Amplify and Forward Repeater (AFR) to enhance multi-user beamforming systems, in which the AFR is transparent to UEs. Note that in this application, repeaters with embodiments of this invention are referred to as Capacity Projectors (CaPs). FIG. 1 and FIG. 2 show a CaP enhanced centralized system and a CaP enhanced distributed system respectively. PPA 62/104,086 addressed many technical challenges of a wireless network with MU-MIMO and a large number of relays widely distributed over a coverage area, including large number of antennas on the BS and relays, conditions and placement of full-duplex relays, efficient estimation of the total channels, and MU-MIMO beamforming using the total channels. Moreover, it presents significantly more advantageous solutions to dense networks using MU-MIMO and in-band or out-band relays for both sub 6 GHz bands and for cm-wave and millimeter wave (mm-wave) bands. However, it lacks the intelligent control and learning, and active channel shaping capabilities of the present invention.

DETAILED DESCRIPTION

Reference may now be made to the drawings wherein like numerals refer to like parts throughout. Exemplary embodiments of the invention may now be described. The exemplary embodiments are provided to illustrate aspects of the invention and should not be construed as limiting the scope of the invention. When the exemplary embodiments are described with reference to block diagrams or flowcharts, each block may represent a method step or an apparatus element for performing the method step. Depending upon the implementation, the corresponding apparatus element may be configured in hardware, software, firmware or combinations thereof. Here after, a probe or pilot signal may mean a signal transmitted by one antenna for the purpose of estimating the channel between the transmitting antenna and one or more receiving antennas. It may also be called a reference signal, a channel estimation signal or a test signal.

This application presents inventions that construct dynamic and intelligently adaptive wireless communication systems using controllable CaPs and the mechanism of learning and adaptive organization. Embodiments include dynamic capacity distribution, projection and load balancing, use of sensor information, learning, entries of new CaPs, CaP route update, power management, adaptive UE tracing, smart interference coordination, distributed active antennas, enhancement of MIMO spatial multiplexing and active channel shaping. Note that a CaP can have either one receive-transmit path or multiple receive-transmit path. The former is a Single Input Single Output (SISO) CaP and the latter is a MIMO CaP.

Figure 1:
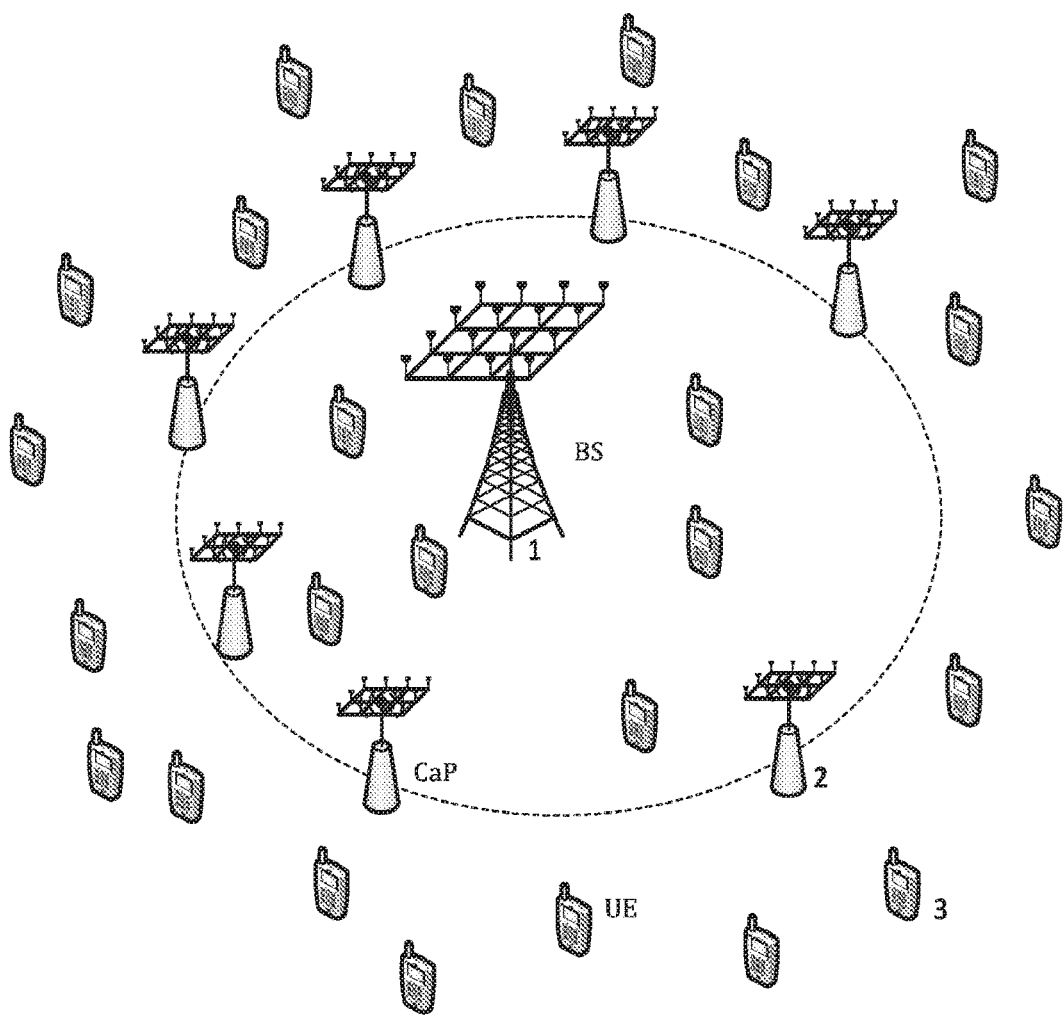
FIG. 1 shows a Capacity Projector (CaP) enhanced centralized system.
Figure 2:
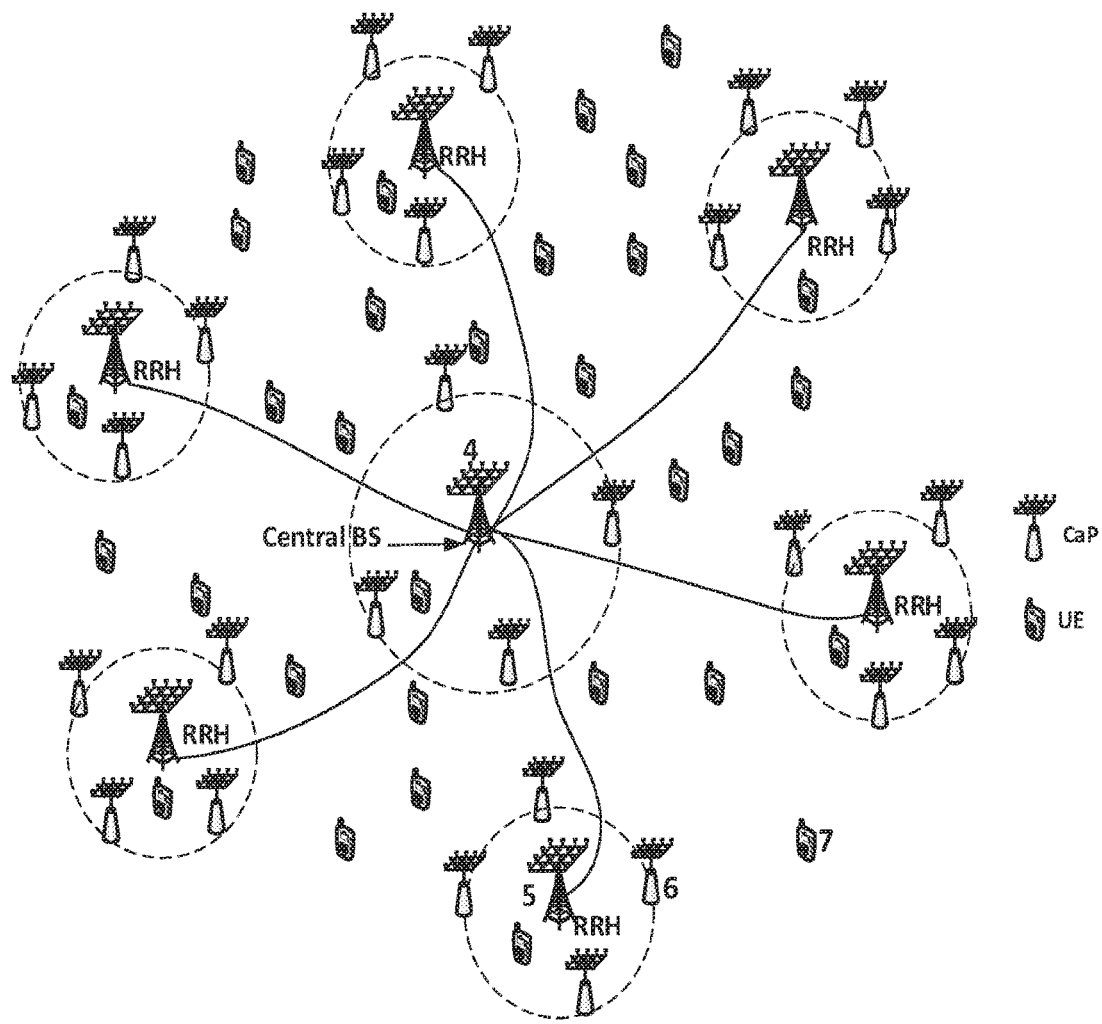
FIG. 2 shows a CaP enhanced distributed system.

Consider a CaP enhanced multi-user beamforming wireless communication system, where CaPs 2 are deployed around each BS 1 in a centralized system to improve the coverage of UEs 3 in the cell edge or weak signal area as shown in FIG. 1 or CaPs 6 are deployed around each Remote Radio Head (RRH) 5 that connect to the central BS via frontaul in a distributed system to extend the coverage of the BS or to enhance the signal quality of UEs 7 in the weak connection area as shown in FIG. 2. The CaP is transparent to the UE, which means that it is equivalent to a scatter in the wireless channel except that it can enhance the power of forwarded signal and/or modify other properties of the forwarded signal including waveform, beam pattern and direction. The channel between a BS and a CaP, the channel between a CaP and another CaP, and channel between a CaP and an UE can be included in the total channel between the UE and the BS. Note that a CaP can be configured with multi-antenna, which can be weighted and combined to realize beamforming, the antenna tilt, beam pattern and horizontal beam direction of the antenna can be adjusted.

Add a New CaP into the System

For a CaP-enhanced system, CaPs can be added according to the practical requirements of the system, the process of which is described as follows.

Access into Network

When deployed and powered on, a CaP registers with a BS using a procedure same to or similar as a conventional UE in the wireless communication network, e.g., like a UE in an LTE/LTE-A network. Then, the BS locates the CaP and records the location of the CaP into its memory. The BS allocates to the CaP a special Connection Identity (CID), which is different from that of a UE.

Hop Node Identification and Uplink Loop Avoidance

Figure 3:
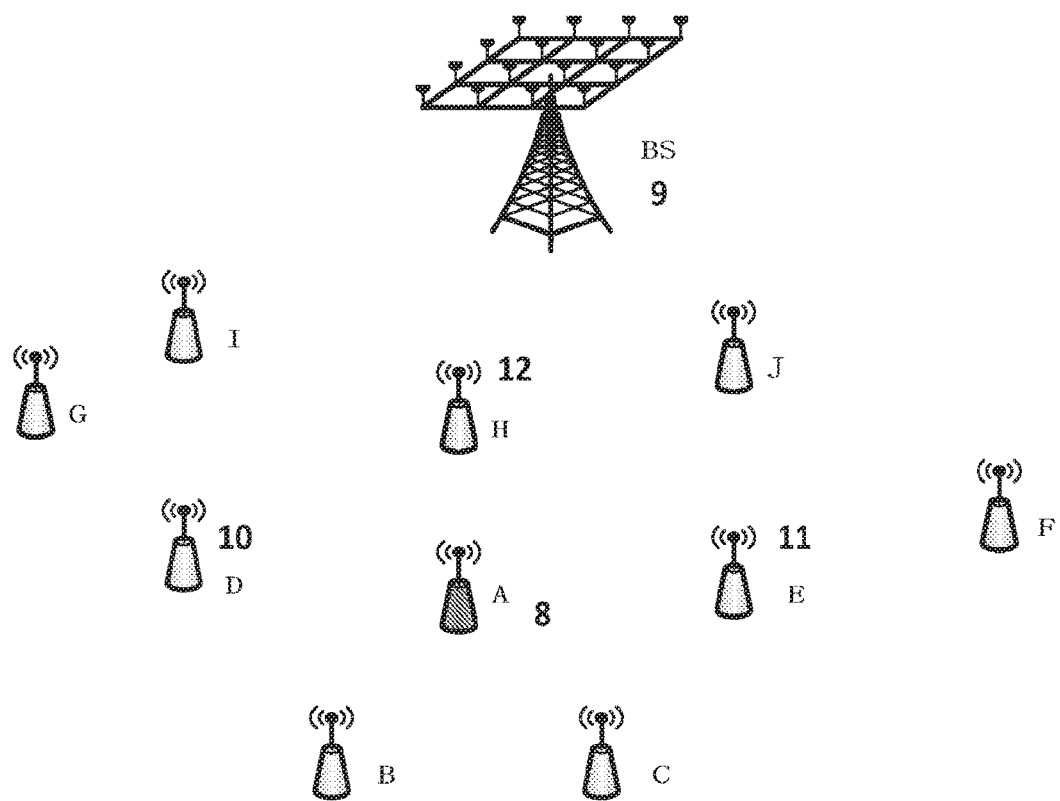
FIG. 3 shows an embodiment for hop node identification and uplink loop avoidance.

After gaining access to the network and registering in the BS, radio resource would be allocated to the newly added CaP to transmit probe signal at power level $P_{n(t,i)}$ in the uplink, where the subscript indicates it is the newly added CAP transmitting in direction t at power level i. During this period, existing in-range CaPs would listen to the probe signal, where in-range CaPs are CaPs around the newly added CaP that may receive signals from the newly added CaP based on estimates of large scale fading at the selected power level i. CaPs that receive the probe signal with Signal to Noise Ratios (SNRs) or Received Signal Strength Indications (RSSIs) or other equivalent indications larger than a predefined threshold feed back their CIDs to the BS, where the set $\Omega_{n(t,i)}^{k(r)}$ is used to contain all these CIDs with the superscript k(r) indicating the receiving direction r of the kth receiving CaPs. Then, the BS allocates resource to these CaPs in set $\Omega_{n(t,i)}^{k(r)}$ to transmit uplink or downlink probe signals at power level $P_{k(s,j)}$, where the subscript indicates it is the kth CAP transmitting in direction s at power level j. The newly added CaP calculates the SNR or RSSI or other equivalent indications of the received signals to identify the CIDs and feeds them back to the BS, where the set $\Omega_{k(s,j)}^{n(q)}$ is used to contain all these CIDs. Then, these CIDs that belong to $\Omega_{n(t,i)}^{k(r)}$ while do not belong to $\Omega_{k(s,j)}^{n(q)}$ are the hop nodes of the newly added CaP at transmitting power level i and directions d(t,q) and the hop nodes are at transmitting power level j and directions d(r,s), where the first variable in d(●,●) is the transmitting direction and the second is the receiving direction. The hop nodes are recorded in the memory of the BS. Since the CIDs belonging to both $\Omega_{n(t,i)}^{k(r)}$ and $\Omega_{k(s,j)}^{n(q)}$ would cause loop among the CaPs, having them transmitting simultaneously at these power levels needs to be avoided, which is also recorded in the memory of the BS. One embodiment is shown in FIG. 3, CaP A 8 denotes the newly added CaP. After accessed into the BS 9, it firstly transmits uplink probe signal at a power level and direction. After detection, the SNRs of CaPs D 10, E 11 and H 12 at selected receiving directions are larger than the predefined threshold and they feed their CIDs back to the BS, which means $\Omega_{n(t,i)}^{k(r)} = \{D, E, H\}$. The BS 9 allocates three probe signals transmitting opportunities to D, E and H respectively. Then, CaPs D 10, E 11 and H 12 transmit probe signals at specified power levels and directions with the uplink transmitting antennas. After detection, CaP A feeds the CIDs associated to CaP D and E to the BS as the associated SNRs are larger than the predefined threshold, which means $\Omega_{k(s,j)}^{n(q)} = \{D, E\}$. Hence, at the selected power levels and directions, the hop node of CaP A is CaP H while CaPs A and CaP D and E would cause loop when working simultaneously. In a special case, each CaP has only one fixed transmitting power, and/or fixed transmitting and receiving direction.

Intelligent and Learning Organization of CaPs

In one embodiment, a BS can send control signals to one or more CaPs to control their parameters, including transmitting power gain in the downlink, transmitting direction, receiving direction, filtering of the receiving signal, filtering of the transmitting signal, switching between sleeping mode and wake up mode. The BS makes a decision on what control signals to send to one or more CaPs based on the output of a service requirement management or an optimization computation using actual and/or predicted UE distribution, throughput demand distribution, channel condition, etc. In another embodiment, a BS uses information from sources other than channel estimates and information from UEs to make decisions on the management of CaPs. These other sources include one or more of other sensors that measure user distribution (e.g., surveillance cameras, motion sensors), schedule of events (such as parades, large shows and conferences etc.), weather conditions, and historical data collected about the wireless network. Information from these other sources may be accessible via a network connection, either wired or wireless, by one or more BSs or a management module, or manually entered into a BS or management module, which uses the information to help predict the spatial and temporal distribution of capacity demands, and a Capacity Distribution Algorithm (CDA) uses such information to determine how to configure the CaPs to project the capacities of the BSs to meet the predicted demands. In another embodiment, how well the distribution of the capacities of the BSs matches the distribution of demands from UEs is measured, and the measurement is fed back to the CDA and the CDA uses the feedback to improve itself. This learning process improves the performance of the CDA.

Another embodiment includes a learning algorithm or module to learn the desired decision for managing the CaPs. The learning algorithm or module evaluates the effect of the decisions based on the information used for making the decision, including channel estimates, feedback from UEs, other sources of information such as surveillance cameras, sensors, weather, event schedules, compare the difference on the predicted and the actual resulting capacity demand distribution, modifies the decision rules so that future decisions become better matched to the actual resulting capacity demand distribution.

In one embodiment, a BS stores a list of one or more paths from the BS to a CaP, where as a stored path contains the information of which CaP or CaPs to use at what parameters to provide coverage to UEs in the coverage of area of the end CaP. An end CaP is the last CaP in a path from the BS. When a CaP works in a sensing state it listens to capacity demands in its coverage area and feeds back to one or more BSs either directly or through one or more paths. When a first BS is near or over capacity, if there is a first CaP that can project coverage into the coverage area of the first BS, and there is a second BS that has available capacity and a path to reach the first CaP with the required SNR, the second BS activates the path and uses the first CaP to project the capacity of the second BS into the coverage area of the first BS.

Transmission Power Gain

One of the most important features of the cellular networks is that the distribution of UEs is changing with time, caused by movements of the UEs. Hence, the smart CaP should be able to adjust its transmitting power gain adaptively according to the UEs distribution in its coverage. In one embodiment for adaptive adjustment of the transmission power gain, a CaP adjusts the power gain independently without the involvement of the BS. The CaP measures the average RSSI/SNR of the received signals in the uplink, if it is larger than a predefined threshold, e.g., the required value to support the largest Modulation and Coding Scheme (MCS), then it reduces the power gain in the downlink and uplink respectively. Otherwise, it increases the power gain in the downlink and uplink respectively. One embodiment is that the maximum power gain of the CaP is quantized into $N_{pg}$ steps, where the CaP reduces the power gain one step each time. However, the CaP can increase multiple steps each time. In one embodiment, a CaP forwards the received signals with the maximum power gain when power on, and adjusts the power gain based on the channel condition thereafter.

In another embodiment, adjustment of the power gain of a CaP is realized with the help of a BS. The BS adjusts the power gain of a CaP according to the SNRs/MCS/RSSI level or other equivalent indications of the channel quality of the UEs covered by the CaP. The BS transmits corresponding control messages to inform the CaP to increase or reduce transmission power gain. The power gain reduction may be continuous, one step at a time, or more than one steps at a time. In one embodiment, the BS learns which UEs are covered by each CaP based on estimates of the location of the UEs and the recorded location of the CaPs, e.g., an UE is said to be covered by a CaP if the distance between it and a CaP is less than a specific value, e.g., the maximum coverage radius. If the BS learns that the SNR/RSSI levels or other equivalent indications of one or more UEs covered by a CaP is lower than what is required by the smallest MCS level that it can support or the achievable throughput of one or more UEs covered by a CaP is lower than the required Quality of Service (QoS) in the uplink and/or downlink, it transmits a message to the CaP to increase its uplink and/or downlink power gain. Alternatively, if the BS learns that the achievable throughput of all the UE covered by a CaP is larger than the required Quality of Service (QoS) in the uplink or downlink, it can transmit control message to the CaP to decrease the power gain.

Figure 4:
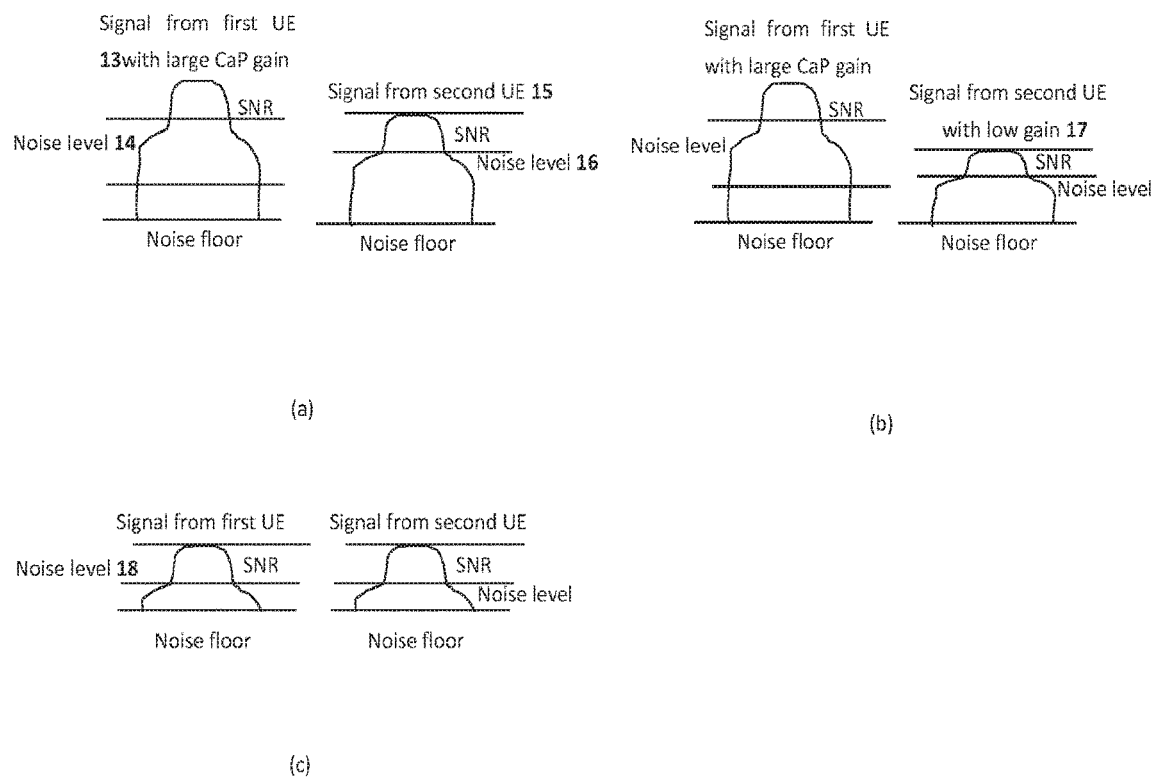
FIG. 4 shows the effect of CaP power gain on proper alignment of noise and signal power levels from multiple RF paths, at least one of which includes one or more CaPs.

In a MU-MIMO network with CaPs, when two UEs are served using the same frequency resource by spatial multiplexing, if a CaP uses a large gain to amplify the signal received by the BS from a first UE 13, the noise level 14 of the amplified signal of the first UE received by the BS can become higher than the noise level 15 of the signal of a second UE 16 received by the BS as shown in FIG. 4-a, or even higher than the signal 17 of the second UE as shown in FIG. 4-b. As a result, when multiple CaPs are used in a MU-MIMO network and their gains are not managed across the coverage area, the noise from one CaP path may bury the signal from another CaP path. In one embodiment, a BS analyzes the channels from multiple UEs to be served on the same frequency resource, and lower or increase the gains of the CaPs involved so that the noise levels 18 from the multiple spatial multiplexed streams are approximately the same as shown in FIG. 4-c, thus avoiding the noise level from one UE passing through one or more CaPs to reduce the SNR of another UE, either with or without one or more CaPs in its channel.

Adaptive Mode Switching

In addition to the adaptive power gain adjustment embodiment, a CaP can be equipped with adaptive mode switch, switching between a work mode and a sleep mode. In the work mode, a CaP performs amplifying and forwarding. In the sleep mode, a CaP does not perform amplifying and forwarding to save power. However, in both modes, a CaP measures the received uplink signal strength periodically and receives control messages from the BS. Three methods for the adaptive state switching are presented below.

Figure 5:
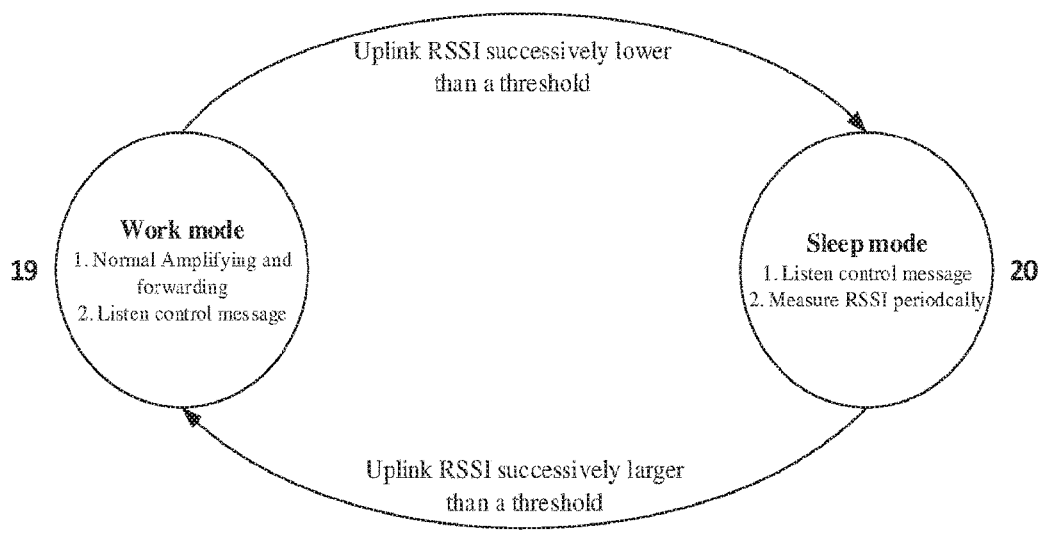
FIG. 5 shows the state transition diagram of the CaP control method.

Method I—CaP Control:

For a CaP in the work mode, it measures the RSSI or other equivalent indications that denote the signal strength of received uplink signals periodically. If the measured RSSI is continuously lower than a predefined threshold, e.g., the minimal RSSI that can access to the network, for a period of time, then it indicates that there is no UE in the coverage of the CaP or the next hop CaP has switched into the sleep mode. The CaP would switch to the sleep mode. In the sleep mode, the CaP still needs to do at least two things. It measures the RRSI of uplink signal periodically, note that the time interval between two successive measurements can be different from that in the work mode, e.g., with a longer period. Meanwhile, it receives the control message from the BS. In the sleep mode, when the measured RSSI is continuously larger than a predefined threshold, e.g., the minimal RSSI that can access to the network, for a period of time, it indicates that there are UEs entering into the coverage of the CaP. Then, the CaP wakes up and switches to work mode. FIG. 5 shows the state-transition diagram between the work mode 19 and sleep mode 20 with this method. An application example is a large gathering that forms and dissipates over a time period. With the controllable CaPs, substantial power can be saved and the quality of wireless communication can be ensured meanwhile. Other similar application scenarios include meetings in office buildings, and sales event in shopping malls etc.

Figure 6:
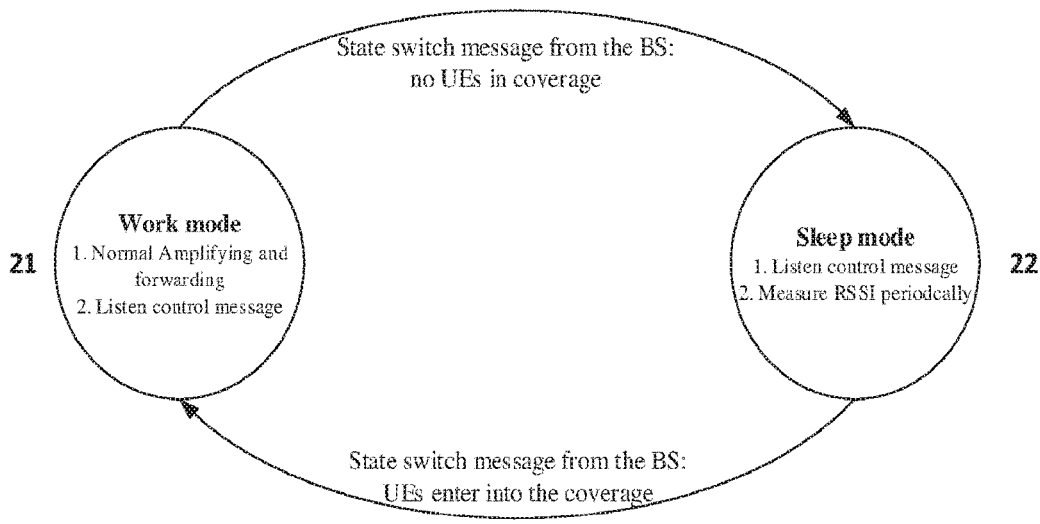
FIG. 6 shows the state transition diagram of the BS control method.

Method II—BS Control:

In this embodiment, the BS learns the distribution of UEs in the coverage of a CaP, e.g., using the known location of the CaP and the estimated locations of each UE, using CaP ID as described before, schedule of events, historical data of UE distribution, or other means. When the BS determines or estimates that it is more advantageous to switch the CaP to sleep mode based on the measured, estimated or predicted distribution of UEs, it transmits a control message to the CaP to command the CaP to switch to the sleep mode. When the CaP is in sleep mode, the BS transmits a control message to the CaP to wake it up if the BS determines or estimates that it is more advantageous to switch the CaP into the work mode based on the measured, estimated or predicted distribution of UEs. The CaP in the sleep mode still needs to receive the control message from the BS, which is similarly to receive the paging message from the BS for the conventional commercial terminals in LTE/LTE systems. A CaP can extend the interval between the receiving of the paging message to save power. FIG. 6 shows the state-transition diagram between the work mode 21 and sleep mode 22 of this method.

Figure 7:
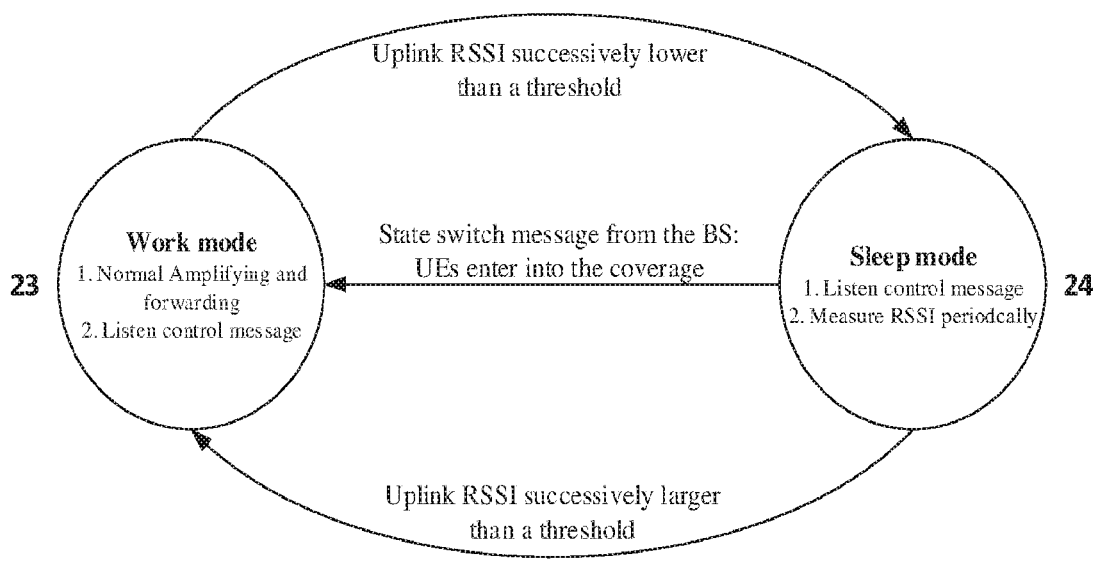
FIG. 7 shows the state transition diagram of the hybrid control method.

Method III—Hybrid Control:

This method is a combination of methods I and II, where the CaP controls the switch between the sleep and work mode while the BS supervises the CaP and can overwrite a CaP's decision. This method can reduce the probability that a CaP switches to a mode falsely to affect the communication quality. When a CaP is in the work mode, it monitors the RSSI or other equivalent indications as described in method I and it transmits a state switch request message to the BS when the RSSI is lower than a predefined threshold value. The BS uses measurements, estimates or predictions of the distribution of UEs available to it to verify the switching. If the request is denied by the BS, the CaP would receive a negative acknowledgement (NACK) message from the BS, and the CaP will not execute the switching. Otherwise the CaP will switch to the sleep mode if a NACK message is undetected or upon receiving a confirmation message from the BS. The CaP would switch from the sleep mode to the work mode directly if it learns the average RSSI is higher than a predefined threshold and transmit a state switch message to inform the BS. The BS can also overwrite this switching based on measurements, estimates or predictions of the distribution of UEs available to the BS. Moreover, if the BS determines or predicts that some UEs will enter or are entering into the coverage of a CaP, it transmits a control message to inform the CaP to switch to the work mode if it is in the sleep status. FIG. 7 shows the state-transition diagram between work mode 23 and sleep mode 24 in this method.

Location-Aware Organization and Intelligent Active Channels

In another embodiment for identifying association of UEs to one or more CaPs, a CaP broadcasts its CaP ID, UEs receiving the CaP ID feed back the CaP ID to the CaP and/or directly or indirectly through the CaP to the BS. Alternatively, a CaP adds its CaP ID to the signal it transmits to the BS using designated resource elements. In one embodiment, a UE may be covered by more than one CaP. In another embodiment, a UE is covered by only one CaP. In this embodiment, one or more BSs using MIMO to beamform to one or more CaPs, with one or more streams of data to each CaP, and each CaP can communicate with one or more UE in its coverage area. Since the BS associates a spatial stream with a single CaP, if the DL or UL SNR/RSSI etc of a spatial stream is not strong enough, the corresponding CaP is easy to identify, and the power gain of the CaP associated with the spatial stream in the corresponding direction can be increased to bring up the SNR/RSSI etc. In the case of each CaP communicates with one UE in DL and/or UL at a time, the CaP uses all frequency resources to communicate with this UE, and if the CaP has multiple antennas and is capable of MIMO, it uses single-user SU-MIMO to communicate with this UE. In the case of each CaP communicates with more than one UE in DL and/or UL at a time, different frequency resources are used to communicate with different UEs. In this case, the BS communicates with multiple CaPs using the same frequency resources by spatial multiplexing but each UE under a CaP uses a different frequency resource. Furthermore, if the CaP has multiple antennas and is capable of MIMO, it can use multiple-user MU-MIMO spatial multiplexing to communicate with multiple UEs using the same frequency resources, thus increase the spectral efficiency. An AFR CaP can perform MIMO beamforming using analog beamforming circuits. A CaP that down-converts received signal to the baseband and performs FFT on the received signal can perform MIMO beamforming tuned to sub-carriers.

In the case of a UE covered by more than one CaPs that down-converts received signal to the baseband and performs FFT on the received signal, instead of a BS beamforms directly to the UE through the more than one CaPs using the total channel as described in PPA 62/104,086, one or more BSs can beamform with the more than one CaPs, and the more than one CaPs coordinate to preform distributed MIMO with the UE. If the UE has more than one antenna and RF chains, more than one data streams can be beamformed with the UE. The embodiment is easily extended to multiple UEs each of which is covered by more than one CaP, in which the more than one CaPs coordinate to preform distributed MU-MIMO with the more than one UEs covered by the CaPs.

Figure 8:
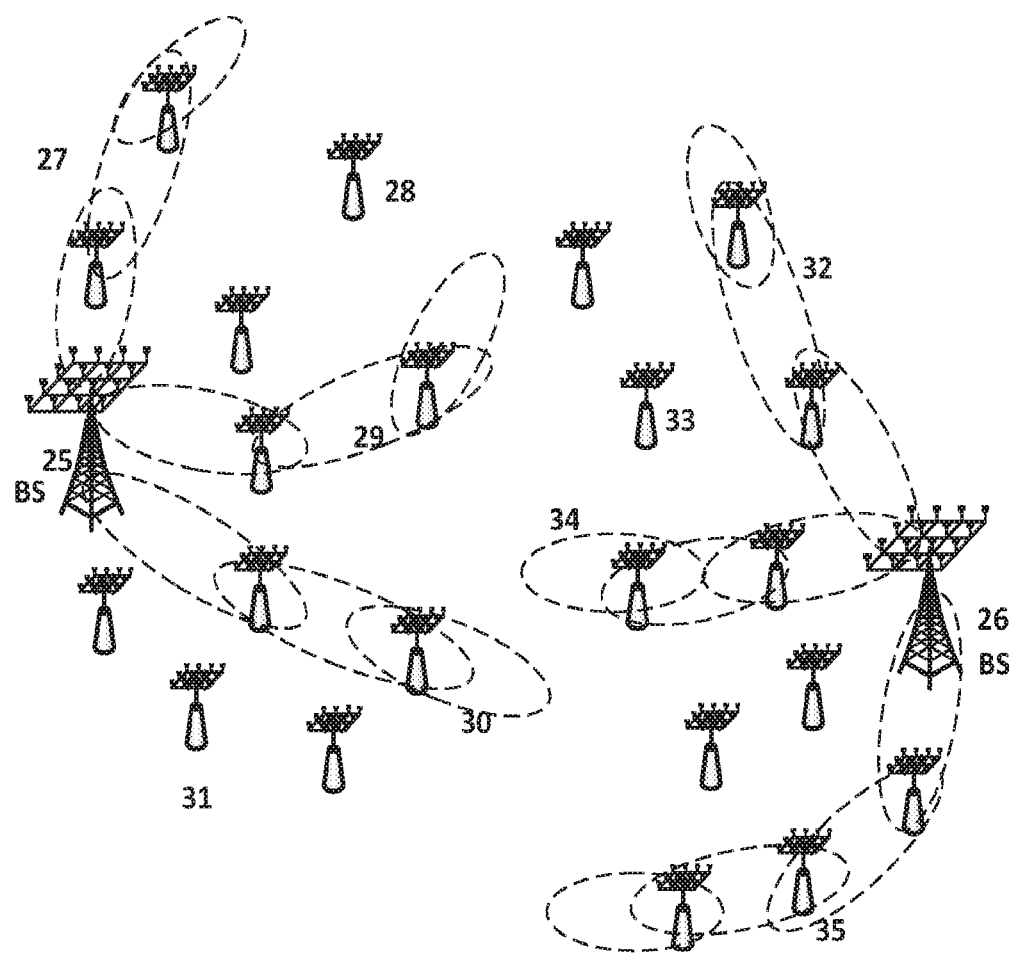
FIG. 8 illustrates examples of using CaPs to realize location-aware organization and intelligent active channels.

In a location-aware embodiment, the broadcasting/control channel of a BS uses a broad antenna beam with high transmission power to cover a large area, but the data channel uses low transmission power that only covers the cell center and uses CaPs to extend the data channel to cover the cell edge, extending the data channel coverage to match the broadcasting channel. The BS records the locations of the CaPs. The BS may also maintain typical or historical channel characteristics of locations around each CaP. The BS uses a broadcasting channel to register UEs into the network and control the CaPs. When the locations of the multiple UEs to be served are also known, the BS uses its knowledge of the locations of the CaPs, and optionally its knowledge of the typical or historical channel characteristics of locations around each CaP to decide which CaPs to turn on and/or off and/or how to configure the gains and/or other transfer function characteristics of the CaPs to achieve the desired channel matrix and throughput. This embodiment can greatly reduce interference among the multiple spatially multiplexed beams by interleaving the on/off of CaPs, i.e., turning off CaPs that are between the CaPs serving two spatially separated UEs or two spatially separated groups of UEs. It can also greatly reduce interference among neighboring cells by having the neighboring cells to coordinate the scheduling UEs to enable the turning on/off of CaPs to have another kind of interleaving, i.e., an interleaved on/off pattern at the cell edges. Both cases are shown in FIG. 8. In FIG. 8, in the coverage area of BS1 denoted by number 25, the CaPs are divided into 5 groups, denoted by the numbers 27, 28, 29, 30, and 31. Similarly, in the coverage area of BS2 denoted by number 31, the CaPs are also divided into 5 groups, i.e., denoted by the numbers 32, 33, 34, 35, and 36. To avoid intra-cell and inter-cell interference collision, the CaPs in groups 28 and 31 are turned off and 27, 29 and 30 are turned on under BS1 25 while the CaPs in groups 33 and 36 are turned off and 32, 34 and 35 are turned on under BS2 26. If locations of UEs are not accurate, the BS determines the UE's locations to within a region, some or all of the CaPs whose coverage areas overlap the regions of the UEs are selected to be turned on, with the consideration of interleaving to reduce interferences.

Instead of using a high power transmitter with broad coverage antenna(s) for the control channel, a low power transmitter can be used in conjunction with distributed amplifying-and-forwarding repeaters for the control channel. Such repeaters may be separate from the CaPs and use a specified frequency range, or integrated with the CaPs for the data channel. In the latter case, the control channel and the data channels use separate circuits in the CaP so that the circuit for data can be turned off when the CaP has no UE to serve. Alternatively, the control channel and the data channel use the same circuit, but the control channel uses a small frequency range, thus the CaP outputs no signal power in the data channel frequency range when the CaP has no UE to serve.

In the location-aware embodiment above, the BS needs to know the location of the UEs to determine which CaPs to turn on/off. A UE can determine its location using GPS or other geolocation system, or using cellular signals from multiple BS and feeds its location back to the BS. In another embodiment, instead knowing the location of a UE, the BS can instead collect information about which CaPs provide good coverage to a UE. In one embodiment, in special time and/or slots, each CaP inserts its ID (CID) in DL to broadcast to its coverage area, and a UE receiving the CID feeds it back in UL to the BS. The BS can use that information to determine which CaP to turn on/off instead of using the location of the UE relative to the location and/or location based channel characteristics. To enable the detection of CIDs of multiple CaPs reaching the same UE, different CaPs can use a different time and/or frequency resource to broadcast its CID. When a new CaP is added to the network or when the network resets or the BS reboots, the time and/or frequency resources for broadcasting CIDs can be re-assigned to the CaPs and CaPs sufficiently separated can be assigned the same time and/or frequency resource for broadcasting CID.

In another embodiment, a network of positioning devices are used to enable a BS or a CaP to detect the presence of UEs via Device-to-Device (D2D) communication or Machine-Type Communication (MTC). A plural of low energy Wireless Positioning Devices (WPD) deployed on or near a CaP detect device IDs of UEs nearby that the UE broadcasts using a wireless protocol and frequency band different from the frequency band used by the BS and CaP for cellular communication, e.g., Bluetooth in the ISM 2.4 GHz range. When one or more WPD detect the presence of a UE in its neighborhood, the WPD reports it back to the CaP(s) associated with it and the CaP(s) knows that the UE is in the coverage range of that WPD, which can be made small to increase the accuracy of determining the location of the UE. Alternatively, each WPD broadcasts a unique identifier and a UE reports back to a BS the unique identifier(s) it receives. The BS uses the location(s) of the unique identifier(s) to determine the area covered by the associated WPD(s), and hence location of the UE. The BS can then look up the CaP(s) who can cover the area. The BS can then use the information to control the on/off and/or configurations of the CaPs. A CaP can also snoop the WPD identifier(s) a UE sends back to the BS and determines the presence of UE in its coverage area. In embodiments where a CaP knows the presence or absence of UEs in its coverage area, the decision to turn off a CaP when there is no UE in its coverage area can be made locally by the CaP, and the the decision to turn on a CaP when there is one or more UEs in its coverage area can also be made locally by the CaP. In the latter case, the BS can still turn on/off a CaP based on its analysis of desired network organization to achieve required throughputs for the UEs in the coverage area of the BS. The above embodiments can be applied to small cells as well wherein a small cell obtains information about the presence or absence of UEs in its desired coverage area detected using WPDs and D2D communication, and turns off a small cell if no UE is detected in its desired coverage area.

With the functions described in this application, the use of CaPs distributed in the coverage area of one or more BSs creates an intelligent and controllable active wireless channels between the one or more transmitters and one or more receivers, e.g., between one or more BSs and one or more UEs. This is in contrast to conventional wireless channels that passive, fading only and non-controllable. The embodiments in this invention can change the RF path from a transmitter to a receiver via one or more CaPs, i.e., controllable, intelligent and active repeaters, can change a plural of channel characteristics by changing the on/off, beam direction, beam pattern, power gain, phase, frequency selectivity or delay spread of one or more CaPs along a RF path. In a MIMO setting, the aforementioned parameters or states of distributed CaPs can be configured to produce a better conditioned channel matrix conducive to a high order of spatial multiplexing.

Distributed Active Antennas and Multi-Layer MIMO Beamforming

In a MIMO network, the distributed CaPs can be considered as distributed active antennas that can be controlled and configured to enhance MIMO performance such as improving the condition number of the channel matrix for high order spatial multiplexing in a MU-MIMO system. One of the effects of having repeaters in a RF link is the increase of delay spread due to increase in multipath, which reduces the coherence bandwidth. An equalization filter can be used in each amplify-forward path of the CaPs to reduce this effect. Alternatively, a CaPs that causes large delay spread of the channel can be turned off or its gain can be lowered to reduce its range. In a MIMO network when the beamforming precoding includes the effect of the CaPs in the channel estimates, the signal from the plural of amplify-forward circuit paths will add up coherently at its intended UE. The beamforming procoding can be performed centrally at the BS or with part of the beamforming performed at the BS and other part at the CaP. In an individual MIMO CaP with multiple amplify-forward circuit paths, the CaP can obtain the channel estimates from the CaP to the receiver and use the channel estimates to control the parameters of a filter embedded with each amplify-forward circuit path to ensure when the signals from the multiple amplify-forward circuit paths of the CaP reach the receiver, they add up coherently.

In one embodiment, MIMO beamforming comprises two layers. In the first layer, one or more BS beamforms multi-streams of data to distributed CaPs, either using analog beamforming circuits or baseband digital precoding. Then a second layer precoding is performed to beamform to the UEs. Both layers can be performed at the BS. The BS can obtain estimates of the channel between the BS and the CaPs, and the total channels from the BS to the UEs, by having the CaPs and UEs sending UL sounding signals or by BS sending DL pilot signal and having the CaPs and UEs feeding back the channel estimates to the BS. The second layer beamforming can also be performed by the CaPs by equipping the CaPs with baseband processor or digital controlled RF beamforming circuits. In this case, the CaPs can obtain the estimates of the channel between the UEs and the CaPs, by receiving UL sounding signals from the UEs or by CaPs sending DL pilot signal and having the UEs feeding back the channel estimates to the CaP. An advantage of performing a first layer beamforming to the CaPs is that the BS can receive the sounding signal a UE sends in UL to BS for channel estimation pilots at a higher SNR, thus improving the accuracy of channel estimation for the second level of beamforming. The first layer of MU-beamforming to the CaPs can also be achieved using highly directional antennas, preferably steerable or switchable, either on the BS or on the CaPs or on both. Baseband beamforming, e.g., using precoding or detection matrix, is performed for communication with UEs via the CaPs. This is a hardware built-in two-level beamforming, In another beamforming embodiment, instead of having a BS directly beamforms to the UEs through the distributed antennas of the CaPs using the total channel estimates that include the effects of the CaPs, the BS explicitly beamforms to both the CaPs and UEs, treating the CaPs and UEs all as targets of the beamforming, i.e., as final receivers of data or originating source transmitters of data. In other words, the MU-MIMO procoding or detection computation will treat each CaP that is active as if it is a UE. This is an innovative extension of MU-MIMO because the data to be sent to or received from the CaPs are functions of the data sent to or from the UEs and the channel matrix. As a result, the beamforming computation requires a two-step process to first estimate the precoding or detection matrix to be applied to the data to be sent to or received from the UEs to obtain the data to be sent to or received from the CaPs. Then, using the estimated data to or from the CaPs, the MU-MIMO precoding or detection matrix is obtained by treating both CaPs and UEs as final receivers of data or originating source transmitters of data.

In one embodiment, there are a sufficient number of CaPs and a fraction of them are redundant, meaning that some or all of the sub-areas in the intended coverage area are covered by multiple CaPs and the sum of the number of antennas on all the CaPs far exceeds the number spatially multiplexed streams to UEs. One or more BSs select which CaPs to use to create a favorable channel condition or channel matrix for MU-MIMO. The BS have the knowledge of the locations of the CaPs, and can obtain knowledge of the large scale fading channel between the BS and each CaP and between CaPs in a multi-hop RF link. The BS can also obtain estimates the inter-CaP large scale fading, either through modeling or through feedback from the CaPs because the CaPs can obtain estimates of the inter-CaP large scale fading by having all other CaPs receive when one CaP is sending a pilot signal for channel estimation. The BS uses such channel information to select and configure CaPs and the associated distributed antennas and schedule beams to CaPs and UEs under their coverage that have low inter-beam interference, and optionally, low inter-cell interference. Configuring the selected CaPs can include, but is not limited to, setting the gain, transfer function, equalization filter, antenna direction and beam patterns of the CaPs with the objective to create channels that optimize the total throughput of the groups of scheduled UEs passing through the selected multitude of CaPs in a given time slot.

An issue with MIMO CaPs that have multiple receive-transmit antenna pairs is the correlation of their channels due to the close proximity of the antennas or due to the desire to keep the size of CaP small and enclose either the service antennas or both the service and link antennas in a compact case. Service antennas are the antennas that provide service to UEs and link antennas are the antennas that provide wireless link to a BS. The correlation is especially high when two of more closely located service antennas have highly similar directions and radiation patterns. One embodiment to overcome this uses service antennas with different characteristics to reduce the correlation of the channels of the multiple service antennas, including but are not limited to different polarization (different directions of linear or circular polarization), different orbital angular momentum, and different beam directions. In one example of a 2×2 MIMO CaP, one service antenna is directional and another antenna is omnidirectional. In another example of a 4×4 MIMO CaP, two antennas are cross polarized with one orbital angular momentum and another two antennas are cross polarized with another orbital angular momentum. In addition, different filtering in the multiple amplify-forward circuit paths can be used to reduce the correlation of the channels to support spatial multiplexing. The CaP or the BS obtains the estimates of the channels and their correlation, computes the desired filter parameters to reduce the correlation, and sends commands to change the parameters of a filter embedded with some or all of the amplify-forward circuit path to the desired values.

Overall Network Optimization

A mobile network of this invention may comprise of a plural of macro BSs, a plural of small cells and a sufficiently large number of CaPs. The network may apply the multiple intelligent and learning self-organization embodiments described in this application to include the control and configuration of the macro BS, small cells and CaPs to optimize the channel conditions of throughput of the overall network. The control and configurations include changing the power, resource allocation, scheduling and UE grouping, MU-MIMO configuration etc. on the macro BS and small cells, the on/off of the small cells and CaPs, the gain, transfer function, equalization filter, antenna direction and beam patterns of the CaPs. Note that the embodiments of using CaPs to improve the network performance is equally applicable to both a macro BS and a small cell BS.

Another embodiment is a node that can function either as a small cell or a CaP in the same frequency band at different times or as both a small cell using one frequency band or set of subcarriers and as a CaP using another frequency band or set of subcarriers. When such a node functions as a small cell, it uses a wireless link, either in-band or out-band as the frequency used by the small cell for communicating with UEs, to provide the backhaul. When one or more such nodes functioning as CaPs causes the delay spread to be too big or the coherence bandwidth to be too narrow, or when the network performance can be improved by having them function as small cells, they are switched to function as small cells. When one or more such nodes functioning as small cells causes too much inter-cell interference among the small cells or causes difficulty in coordination to manage inter-cell interference, or when the network performance can be improved by having them function as CaPs, they are switched to function as CaPs. One or more BSs analyze which configurations to use to optimize the throughput, including which node to function as a CaP or a small cell, what gain, transmit and receive parameters to use for each node. In a HetNet embodiment, broad coverage is provided by a larger BS using a first frequency band and hotspot coverage is provided by small cells using a second frequency band. A node can be either configured as a small cell to serve UEs in the second band, supported by a wireless backhaul that is either in-band or out-band (which may be the first frequency band and the capacity of the larger BS or special wireless backhaul band), or as a CaP to provide coverage to UE using the capacity of the larger BS in the first frequency band.

Smart Antenna on CaP

For a CaP with multiple antenna elements, if the UEs are evenly or broadly distributed in the coverage area of a CaP, the radiation pattern of the antennas should be broad to cover the whole coverage area to ensure the coverage and the multi-antenna gains of CaP can be achieved. However, in practice, the distribution of UEs changes from time to time, e.g., the UEs are only located in part of the coverage area, which would degrade the antenna gain of a multi-antenna CaP and the transmit power is wasted if antenna radiation pattern of the CaP is kept consistent. Two embodiments for changing the antenna radiation patterns of a CaP to match the distribution of UEs are described below.

Figure 9:
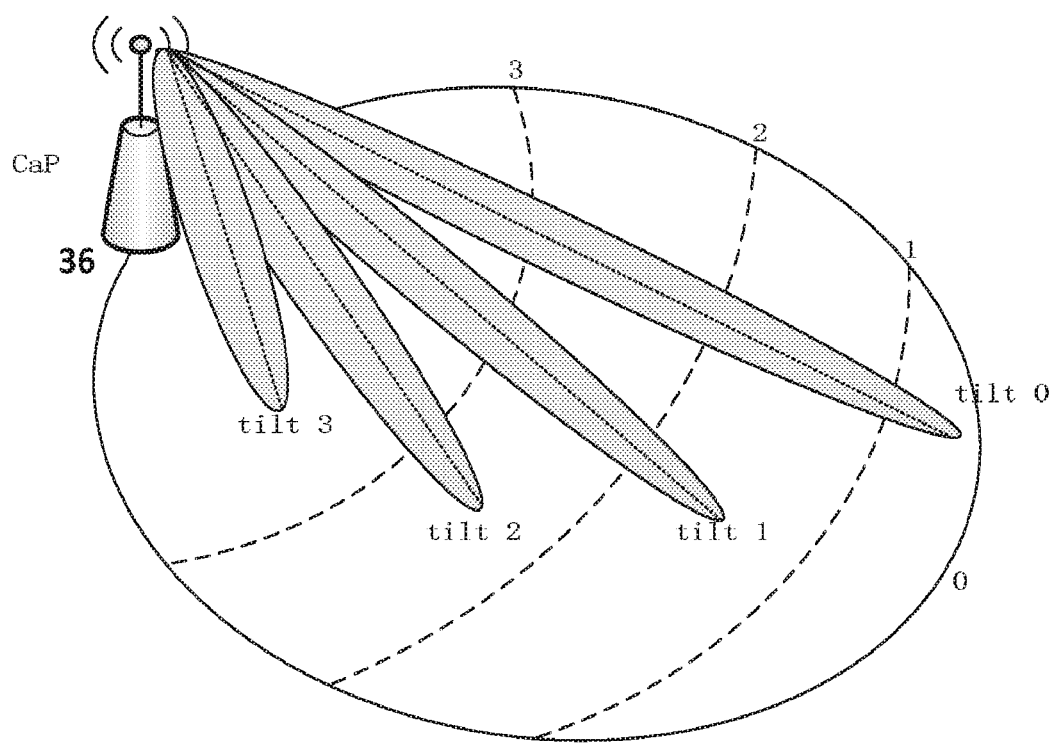
FIG. 9 shows the one of the smart UE tracing method with the adjustment of antenna tilt.

Method I—Adjust the Antenna Tilt:

The antenna tilt of a CaP for the downlink transmission is quantized into $N_{tilt}$ and/or $N_{ring}$ discrete values, where each $N_{tilt}$ value denotes the coverage area from the center, i.e., from the CaP to a boundary within the maximum coverage of the CaP, where the maximum is from the center to the edge of the CaP coverage, and each $N_{ring}$ value denotes a ring within two boundaries from the center. The BS monitors, estimates or predicts the distribution of UEs in the coverage of a CaP and transmits the index of the tilt and or ring to concentrate the radiation energy to match the distribution of the UEs by adjusting the tilt and/or beam pattern of the antenna. Each antenna element can have the same tilt and/or beam pattern in this case. FIG. 9 shows an embodiment of tilt adjustment, where $N_{tilt}=4$ and a 2-bit message is used to inform the CaP 36 to adjust the tilt. The tilts 0, 1, 2 and 3 correspond to the coverage area from the center to the boundary 0, 1, 2 and 3 respectively.

Figure 10:
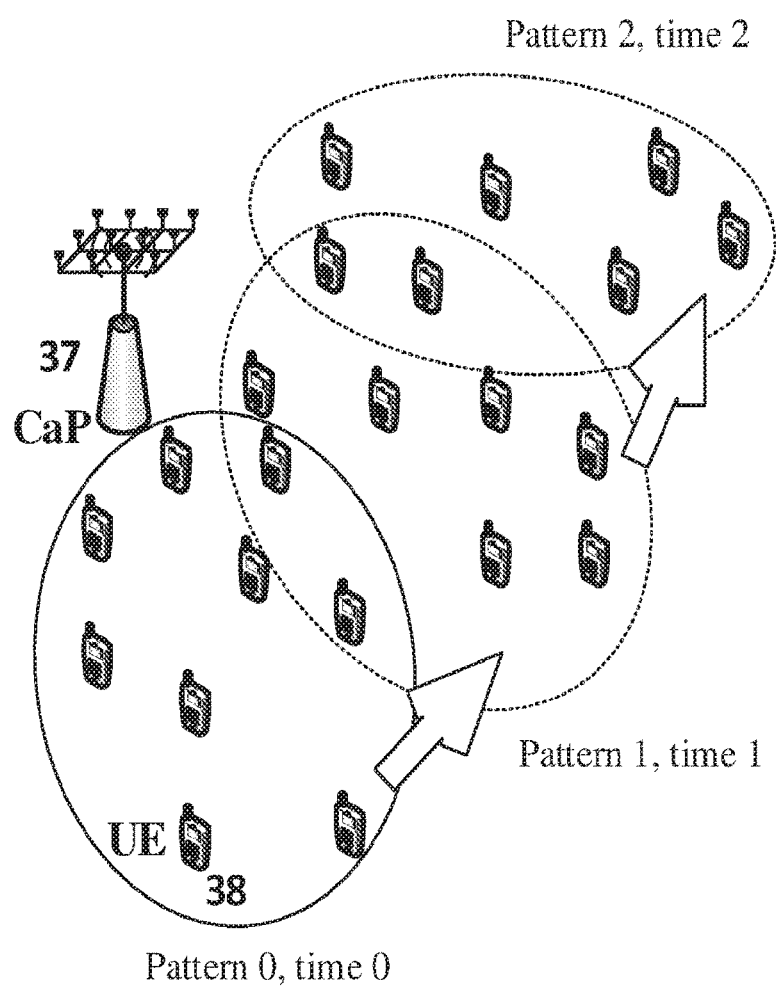
FIG. 10 shows the one of the smart UE tracing method with the adjustment of antenna radiation pattern.

Method II—Adaptive Horizontal Antenna Radiation Pattern Design to Trace UEs:

When a large number of UEs move around in the vicinity of a CaP, only adjusting the tilt and/or beam pattern cannot cover the UEs when they move out of the coverage of the CaP at the current radiation pattern. Hence, adaptive antenna pattern in the horizontal plane is needed to track the movement of the UEs. In this method, the BS monitors, estimates or predicts the distribution of the UEs, and the BS determines a radiation pattern of the CaP to match the distribution of the UEs. In one embodiment, the BS determines the panning of the CaP antenna pattern needed and sends a control message via the downlink control channel to the CaP to change its panning in addition to the tilt and/or beam pattern in method I above. Another embodiment uses online pattern design, where the BS calculates the Radio Frequency (RF) weight coefficient of each element of an antenna according to the distribution of UEs so that the antenna radiation pattern can cover the UEs to the largest extent. This is termed as continuous radiation pattern design. The output weight coefficient of each element is transmitted to the CaP via the downlink control channel. Yet another embodiment uses predefined quantized radiation patterns, where the BS selects one of the predefined patterns to cover the UEs to the largest extent and the associated index is passed to the CaP through the control channel in the downlink. FIG. 10 shows an embodiment of changing the beam pattern of a CaP 37, where the beam pattern changes from pattern 0 to pattern 1 and pattern 2 as UEs 38 move.

Load Balance and Re-Organization

Figure 11:
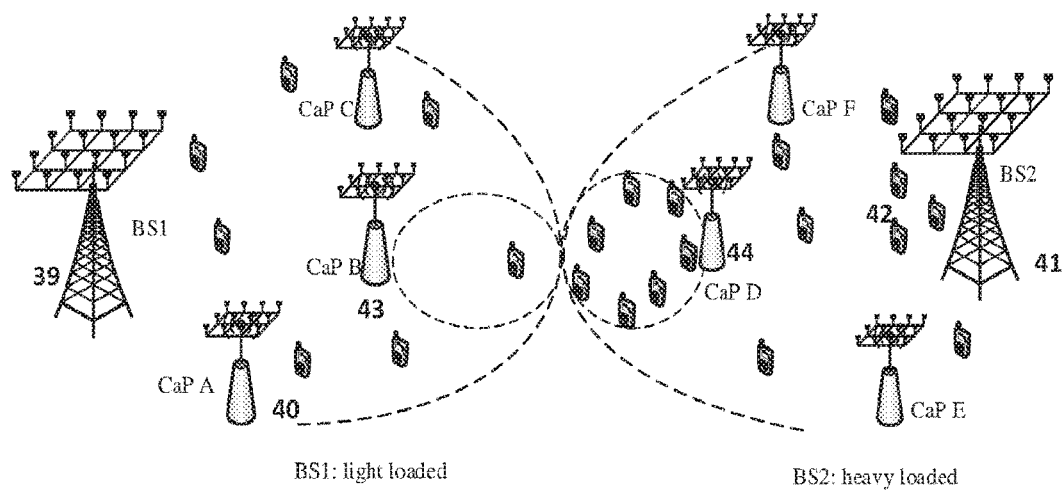
FIG. 11 shows one of the load balance method leveraging CaPs in work mode.
Figure 11:
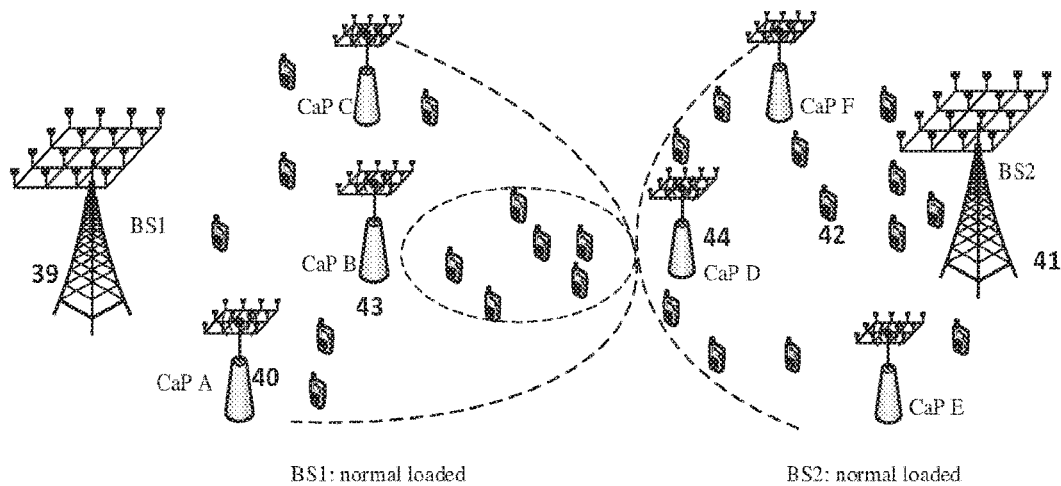

Cell load variations due to changing traffic patterns or UE distributions can lead to some cells being congested while others are left with spare capacity. As shown in FIG. 11, BS-1 39 of Cell-1 has a small number of UEs 40 to be served while the neighboring BS-2 41 of Cell-2 has a large number of UEs 42 to be served. As a result, the limited radio resource is not sufficient for BS2 to serve all the UEs in its coverage and the BS1 has spare radio resource. Since the boundaries of the neighboring cells are determined by the coverage of nearby located CaPs, e.g., 43 and 44, that belong to the two cells respectively in the CaPs enhanced system of this invention, they can be adapted by adjusting the transmit power gains and the tilts of the related CaPs.

Method I:

In one embodiment, a heavily loaded BS negotiates with its neighboring cells to request load balance, which can be realized by exchanging messages through the interface between BSs, e.g., the X2 interface in 3GPP, or the load balancing can be coordinated by the upper management layer, e.g., the Radio Network Controller (RNC) in WCDMA systems, that supervises the associated BSs. When it is determined that load balancing is needed, the heavily loaded BS transmits control message to its associated CaPs that are close to the current cell boundaries between the heavily loaded and light loaded BSs to enter into sleep mode or to diminish its coverage area by increasing the antenna tilt, decreasing the beam pattern and/or decreasing the transmit power gain. On the contrary, the lightly loaded BS transmits control message to its associated CaPs that are close to the current boundaries between the heavily loaded and lightly loaded BSs to enlarge its coverage area by decreasing the antenna tilt, increasing the beam pattern and/or increasing the transmit power gain. This embodiment can be extended to include more than two neighboring BSs. The optimal tilts, beam patterns and/or transmitting power gains of the related CaPs can be iteratively solved by evaluating the load capacity and UE throughput of the neighboring BSs involved in the load balancing. One practical implementation method is that the tilt, beam pattern and/or power gain are quantized into predefined discrete values and the involved BSs change the tilt, beam pattern and/or power gain one step each time, which means that a desired configuration can be obtained after a small number of iterations.

FIG. 11 illustrates an example of load balance between two cells, BS-1 and BS-2, where FIG. 11a shows there is no load balance when BS-2 is heavily loaded while BS-1 is lightly loaded and FIG. 11b shows the load is balanced with CaP B 43 reducing its antenna tilt and increasing transmission power gain and CaP D 44 being switched into the sleep mode.

Figure 12:
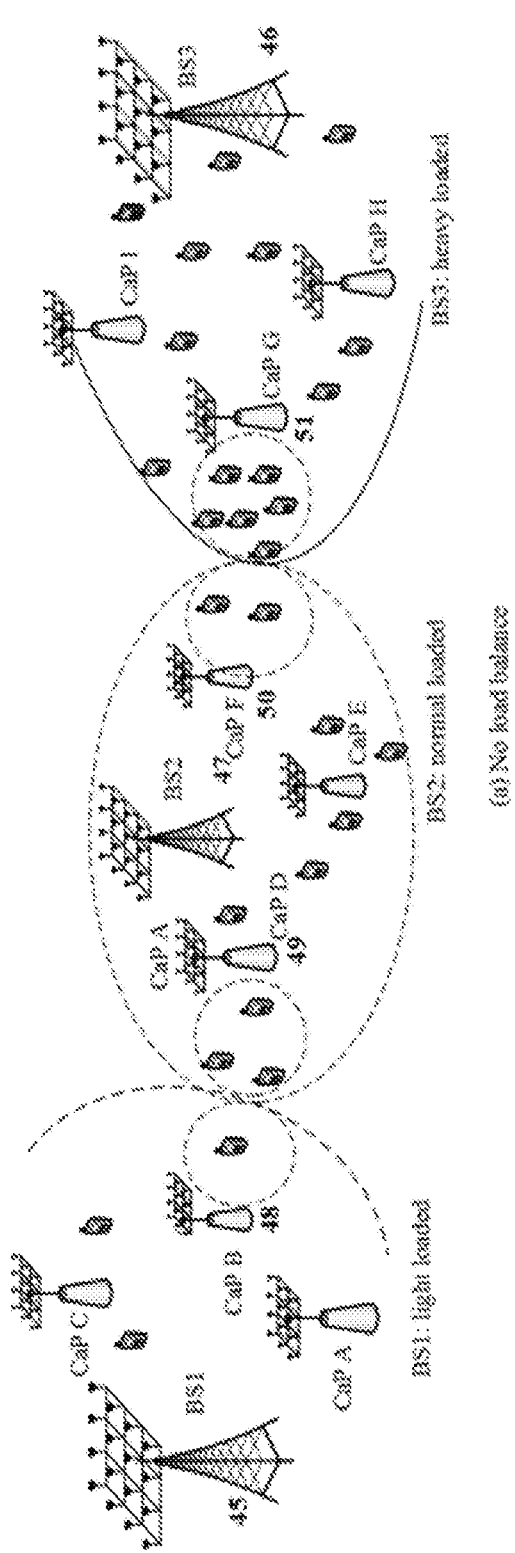
FIG. 12 shows one of the load balance method leveraging CaPs in work mode between two cells separated by an interjacent cell.
Figure 12:
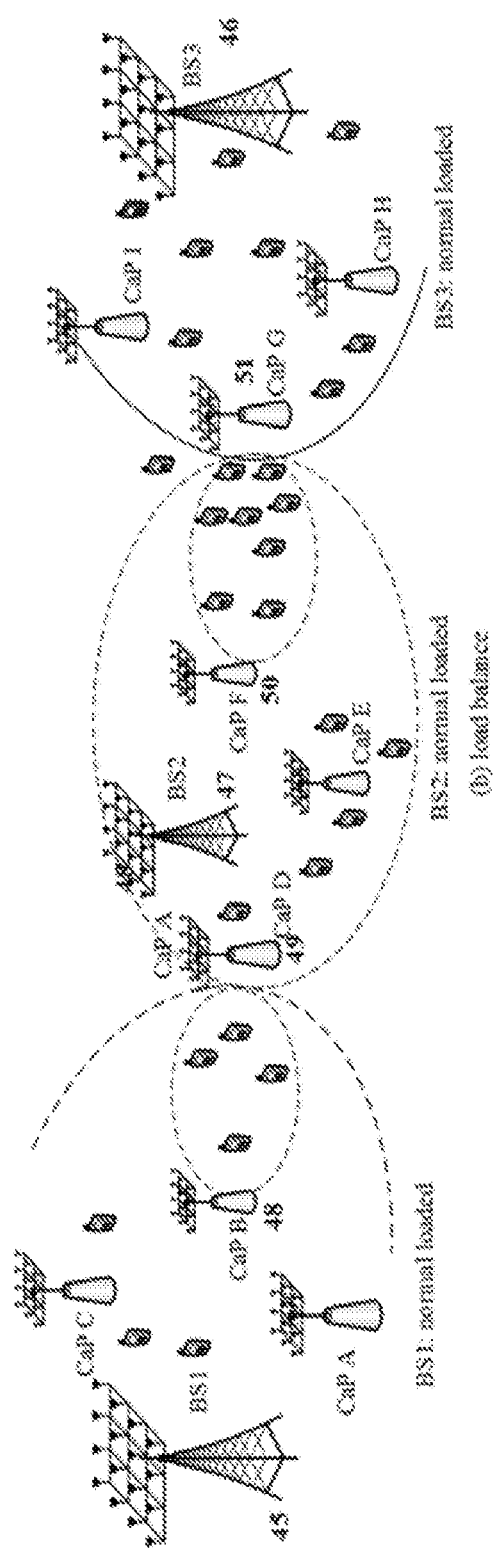

When multiple neighboring BSs are all heavily loaded, the extra capacity of a remote lightly loaded BS can be moved into a non-adjacent heavily loaded cell using several successive load balances between adjacent BSs. In FIG. 12 BS-1 45 and BS-3 46 are lightly loaded and heavily loaded respectively, which are separated by the inter-adjacent normally loaded BS-2 47. To balance the load of BS-1 and BS-3, CaP B 48 belonging to BS-1 45 reduces its tilt and increases the transmission power gain to enlarge its coverage while CaP D belonging to BS-2 47 turns off so that part of the load in BS-2 47 is transferred to BS-1 to free up capacity in BS-2 47 so that it can be projected into BS-3 46. Meanwhile, CaP F 51 belonging to BS-2 47 reduces its tilt and increases the transmission power gain to enlarge its coverage while CaP G belonging to BS3 turns off so that part of the load in BS3 46 is transferred to BS2 47. After the two successive load balances, the spared capacity in BS-1 45 is effectively projected into BS-3, enabling UEs in BS-1 45, BS-2 and BS-3 46 to to achieve desired throughput. More generally, if the lightly load and heavily load BSs are separated by more than one BS, the loads of two BSs can be balanced through several successive load balances between neighboring BSs like the example for the three BSs above.

Figure 13:
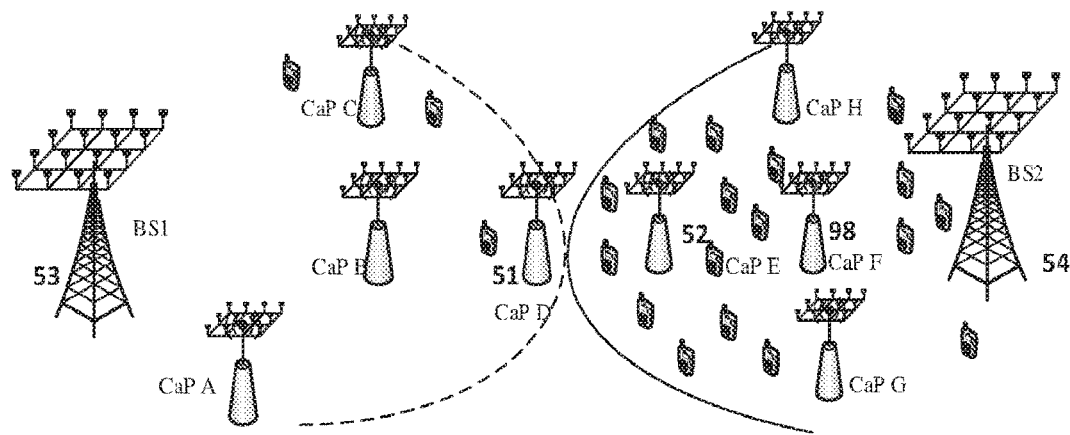
FIGS. 13 (1) and (2) shows one of the load balance method leveraging redundant CaPs between two neighboring cells.
Figure 13:
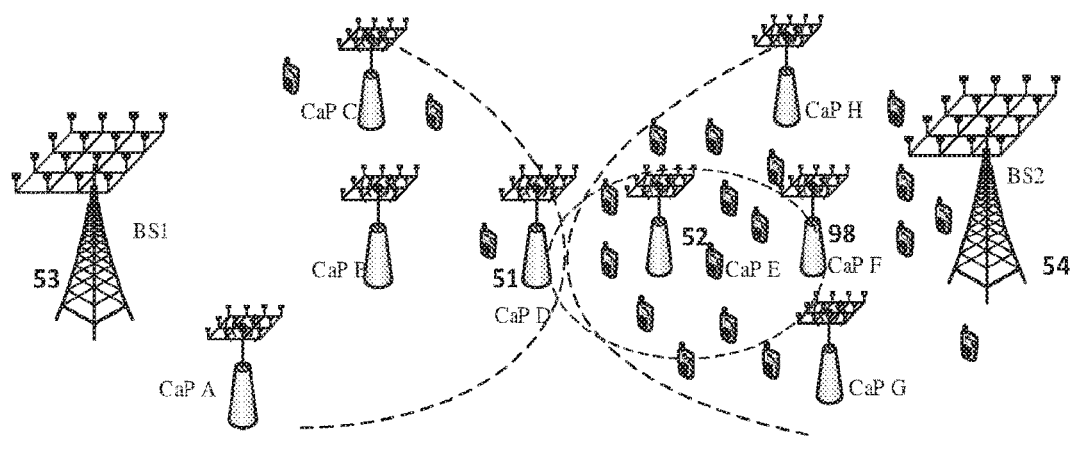
Figure 13:
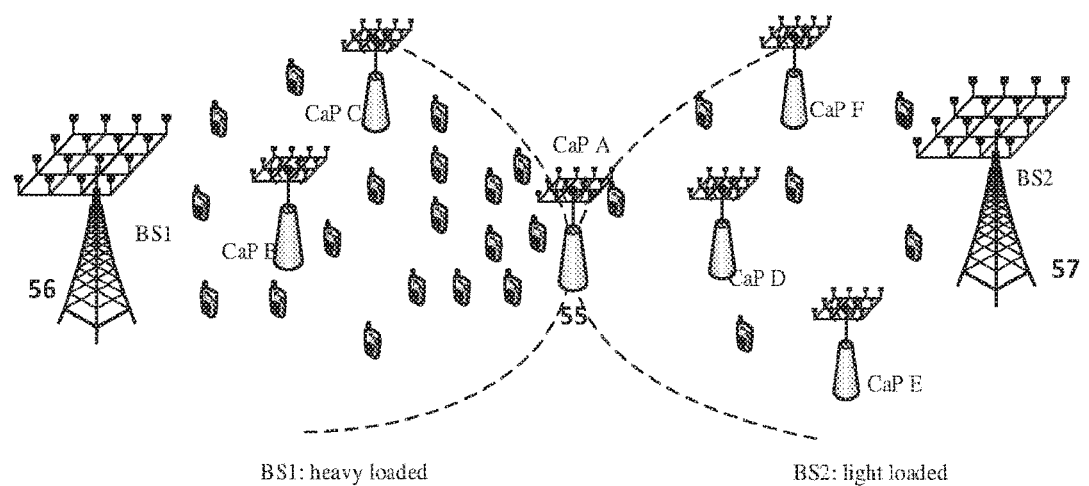
Figure 13:
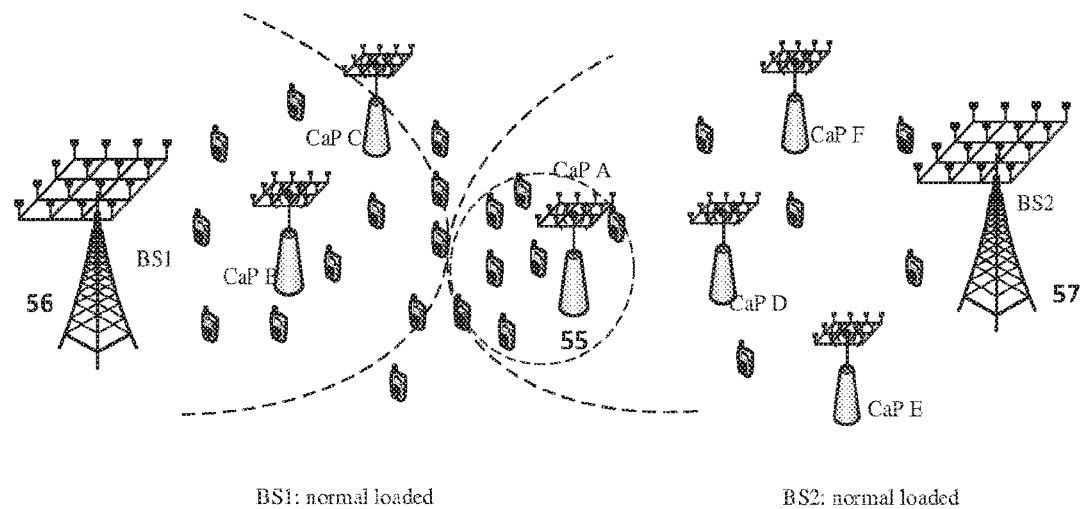

Method II:

In this method, some redundant CaPs are deployed in each cell close to the boundaries between two neighboring cells, e.g., the CaPs D 51 and E 52 as shown in FIG. 13-(1). Most of the coverages of these CaPs overlap that of the neighboring cells, e.g., all or most of the main lobe of the antenna projects into the neighboring cell. These CaPs are in the sleep mode when the neighboring cells are in normal loaded states. As shown in the example in FIG. 13 BS-1 53 is lightly loaded while BS-2 54 is heavily loaded and a load balance will be initiated between these two BSs. Firstly, BS-1 transmits a control message to inform CaP D 51 to wake it up from sleep mode. Then the two BSs adjust the tilts, beam pattern and power gains of CaP D 51 and CaP F 55 as described in Method I above to achieve load balance. The load balance state is shown in FIG. 13-(2), where the power gain of CaP F 55 is 0 and switched to sleep mode. Similarly, CaP E 52 can be waken up if BS-1 is heavily loaded and BS-2 is lightly loaded. When more than two cells are involved to balance the load, the successive balances between neighboring cells as described in Method I can be used.

Figure 14:
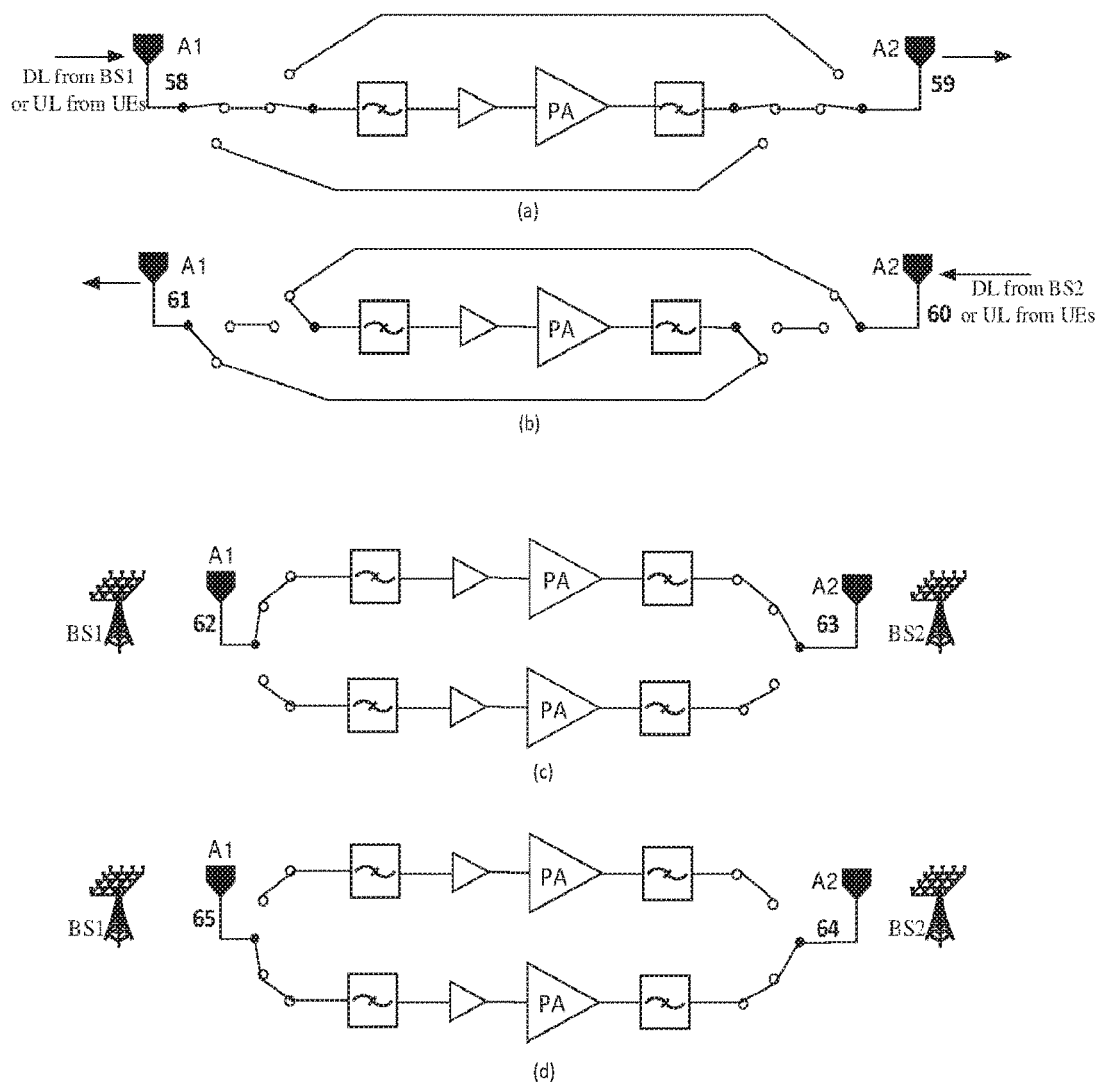
FIG. 14 shows a CaP is placed between two or more BSs and can be associated either one.
Figure 15:
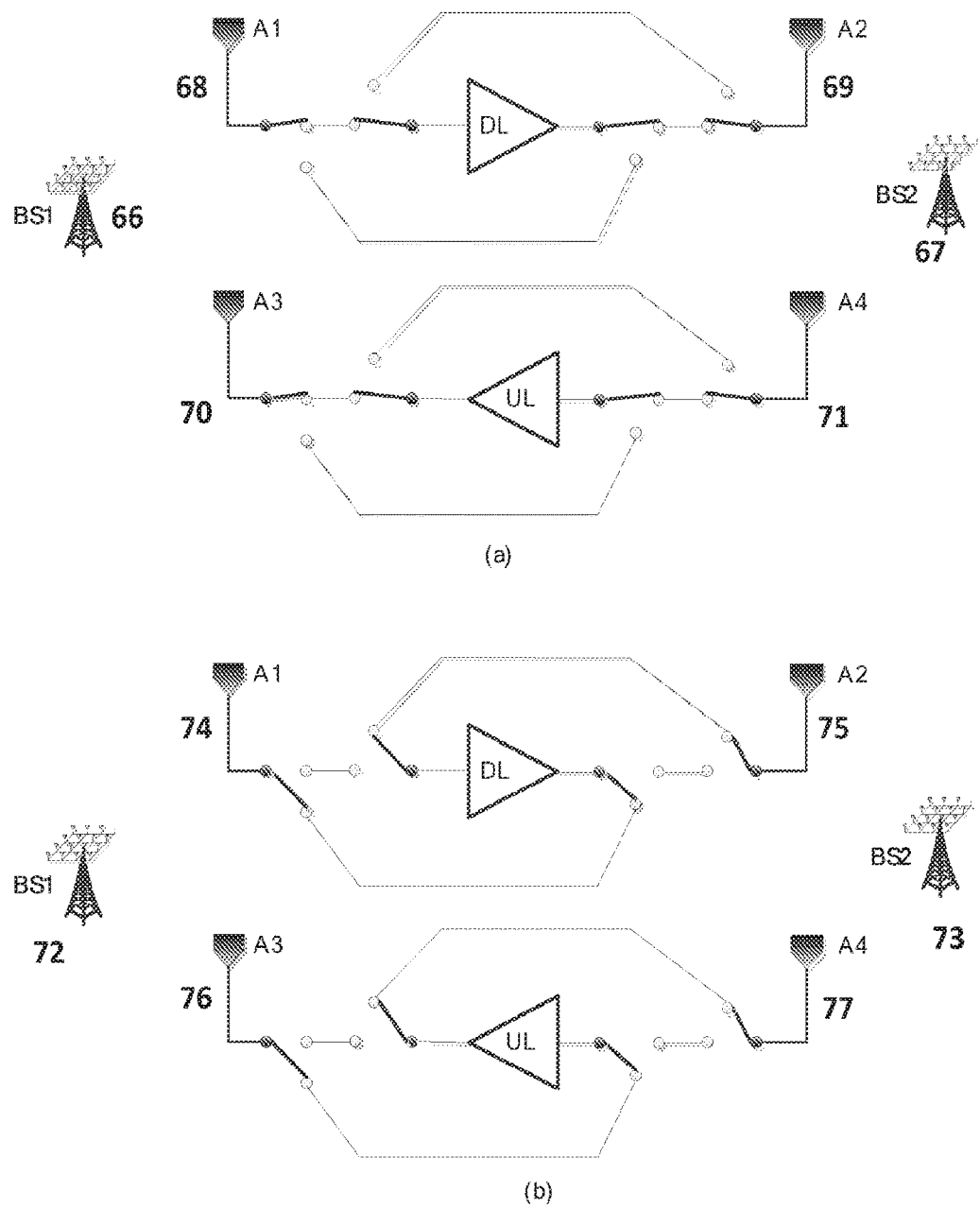
FIG. 15 shows circuits for a CaP in a TDD network that can be switched to serve as an amplify-and-forward repeater for a BS on either side.

In one embodiment, a CaP is placed between two or more BSs and can be associated either one, e.g., as shown in FIG. 14 where CaP A 55 is placed at the cell edge of BS-1 56 and BS-2 57. In one case, when BS-1 56 is overloaded and BS-2 57 is lightly loaded, BS-1 56 reduces its power in the first sector that includes CaP A 55, BS-2 57 increases its power and uses CaP A 55 as a repeater to cover UEs that were previously covered by BS-1's 56 first sector. This effectively projects BS-2's 57 capacity into BS-1's previous coverage area. Conversely, BS-1 can use CaP A to project BS-1's capacity into BS-2's 57 previous coverage area when BS-2 57 is overloaded. In order to achieve this, the CaP is designed differently for a TDD and an FDD network. In one embodiment of a CaP in a TDD network, the CaP has a switching circuit that is synchronized to the TDD networks downlink (DL) and uplink (UL) timing. When the CaP is used as a repeater for BS-1 56, in DL, the switching circuit connects antenna A1 58 to the receiving port and antenna A2 59 to the transmitting port is shown in FIG. 15-a, and in UL, the switching circuit connects antenna A2 60 to the receiving port and antenna A1 61 to the transmitting port is shown in FIG. 15-b. The antennas can be either omnidirectional or directional pointing away from each other. Conversely, when the CaP is used as a repeater for BS-2, the switching circuit is configured as in FIG. 15-b in DL, and as in Y-a in UL. Note that PA in the figure is the power amplifier, additional gain block and filters can be used, and configuration, gain control, and intelligent control modules are not shown in the figure. In another embodiment of CaP in a TDD network, a TDD repeater has two RF paths, one for each direction. A switching circuit configures the signal forwarding direction as shown in FIG. 15-c for DL and in FIG. 15-d for UL when the CaP is used as a repeater for BS-1. The configurations are reversed when the CaP is used as a repeater for BS-2. Note that the repeater in FIG. 15-a and FIG. 15-b can be designed so that the DL and UL radio paths are symmetrical to preserve the channel reciprocity of over the air channel for the benefits of MIMO.

Figure 16:
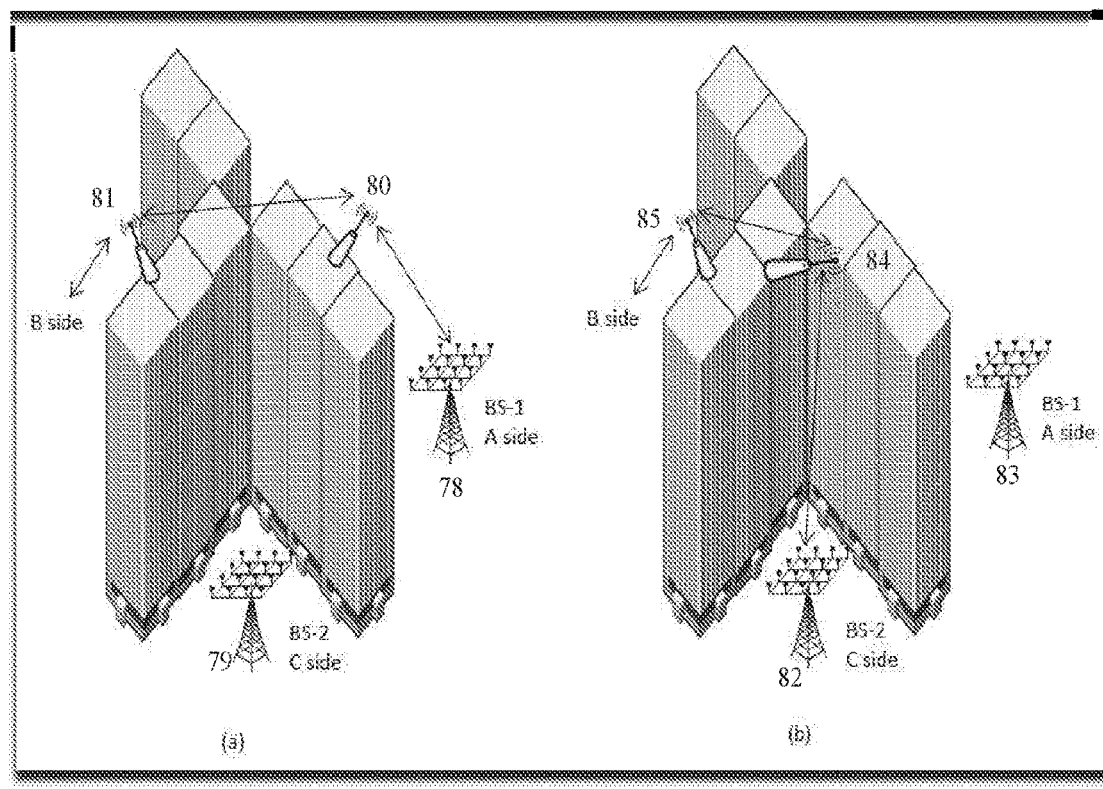
FIG. 16 shows circuits for a CaP in an FDD network that can be switched to serve as an amplify-and-forward repeater for a BS on either side.

In an embodiment of CaP in a FDD network, an FDD repeater with separate DL and UL paths switches to function as a repeater for BS-1 66 as shown in FIG. 16-a, where A1 68 and A2 69 are the receiving and transmitting antennas respectively in the DL and A3 68 and A4 69 are the transmitting and receiving antennas respectively in the UL and switches to function as a repeater for BS-2 73 as shown in FIG. 16-b, where A1 74 and A2 75 are the receiving and transmitting antennas respectively in the DL and A3 76 and A4 77 are the transmitting and receiving antennas respectively in the UL. The embodiment in FIG. 16 uses two pairs of antennas. The switching circuit can be easily modified for a repeater that uses only one pair of antennas and duplexers so that the same repeater can be configured to function as a repeater for either BS-1 or BS-2 as needed.

In one embodiment, a CaP uses one or more directional antennas and steers a beam pattern to maximize or increase the power levels of signals from or to a desired BS or a desired CaP to be used as the neighboring hop. This allows a re-organization of the associations of CaPs with BSs and the CaPs used in RF paths to project a BS's capacity to a desired area. As a result, it changes a CaP's membership in one BS-to-CaP or BS-to-UE RF path to another RF link, e.g., from serving as a repeater of a first BS to serving as a repeater of a second BS. The steering of the beam pattern of such a CaP can be accomplished electronically by beam steering or switching using an array of antenna elements whose signal phases, and optionally power levels, are controlled using digital and/or analog circuits. The steering of the beam pattern of such a CaP can also be accomplished using a directional antenna mounted on a motorized rotating base which rotates under a controller that searches for a direction that maximizes or increases the power levels of signals from or to a desired BS or a desired CaP.

Figure 17:
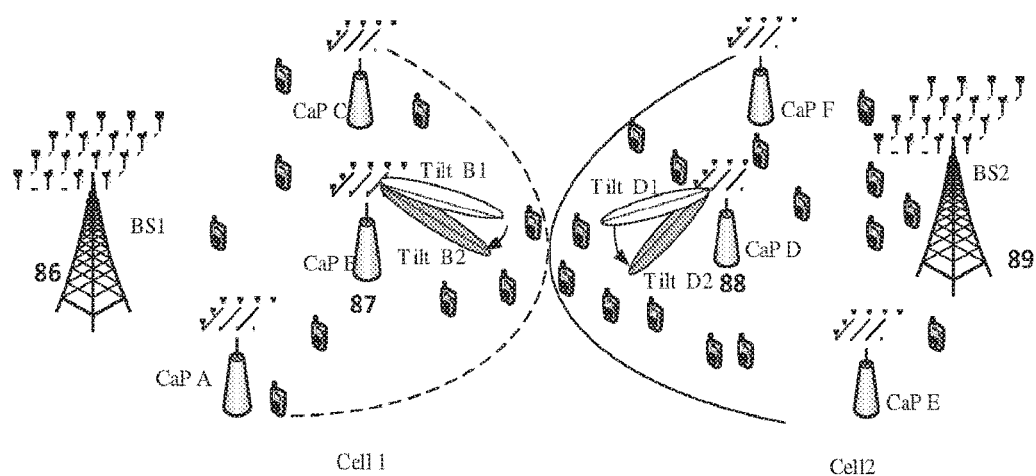
FIG. 17 shows two mobile CaPs on a roof-top that moves to project the signal of a BS on one side of a high-rise building to another side of the building

Another embodiment uses one or more autonomous mobile CaPs, that can travel autonomously on land, water or in air under the command of a BS or a radio access controller to move to a specified position and orientation to achieve the desired load balance between cells as described above. Such a mobile CaP includes a positioning module, e.g., a GPS module, and reports its position to a BS. After a BS determines that a CaP is needed at a location to project the capacity of one BS into the coverage area of a neighboring cell, it selects a mobile CaP, sends a command to the selected mobile CaP, and the mobile CaP uses its on-board GPS and autonomous mobility function to navigate to the location specified by the BS. Such a mobile CaP can either have a power supply cable if the mobility range is short or contains a battery to provide its power. In the case using battery power, charging ports are provided at one or more locations where the mobile CaP can return to for automatic docking and charging. A charging port can be provided at one of the locations where the BS desires the mobile CaP to frequently station at. One example is two mobile CaPs on a roof-top that move to different corners or locations under the command of a BS to project the signal of a BS on one side of a high-rise building to an urban street on another side of the building as shown in FIG. 17. In FIG. 17-*a*, the two mobile CaPs 80 and 81 project the capacity of BS-1 78 on the A side of the building into the street below on the B side, and in FIG. 17-*b*, the two mobile CaPs 84 and 85 project the capacity of BS-2 82 on the C side into the street below on the A side. Another embodiment replaces the two mobile CaPs with fixed CaPs in FIG. 17-*a* or *b* and the two CaPs are configured to either project BS-1's capacity on the A side or BS-2 capacity on the C side to the street on the B side, or project BS-3'*s* capacity on the B side to the street on the A side or the C side.

Interference Suppression Between Neighboring Cells

Terrain variations, network configuration changes and seasonal changes (particularly appearance and diminishment of foliage as seasons change) can change inter-cell interference and may cause some cells to inject more interference into other cells than originally planned. On the other hand, even with small inter-cell interference, the signal-to-interference plus noise ratio (SINR) may be relatively low to satisfy the requirements of UEs' located at the cell edge. In prior art, LTE uses Coordinated Multi-Point (CoMP) and Joint Processing (JP) to manage interference, however, prior art only considers BSs and did not consider the existence of controllable CaPs in the network, nor the use of intelligence and other data from sensors and from the Internet. When CaPs are included, there process becomes significantly more complex. This invention presents embodiments that control and configure CaPs to enhance inter-cell multi-point coordination and joint processing, to reduce interferences between neighboring BSs/cells, and to improve throughput at cell edges.

Figure 18:
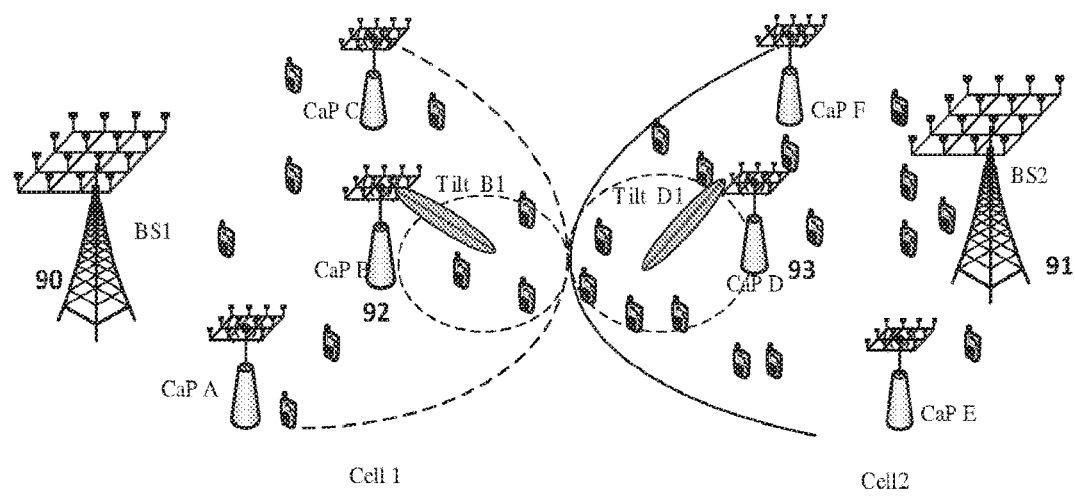
FIG. 18 shows interference coordination between two neighboring cells
Figure 18:
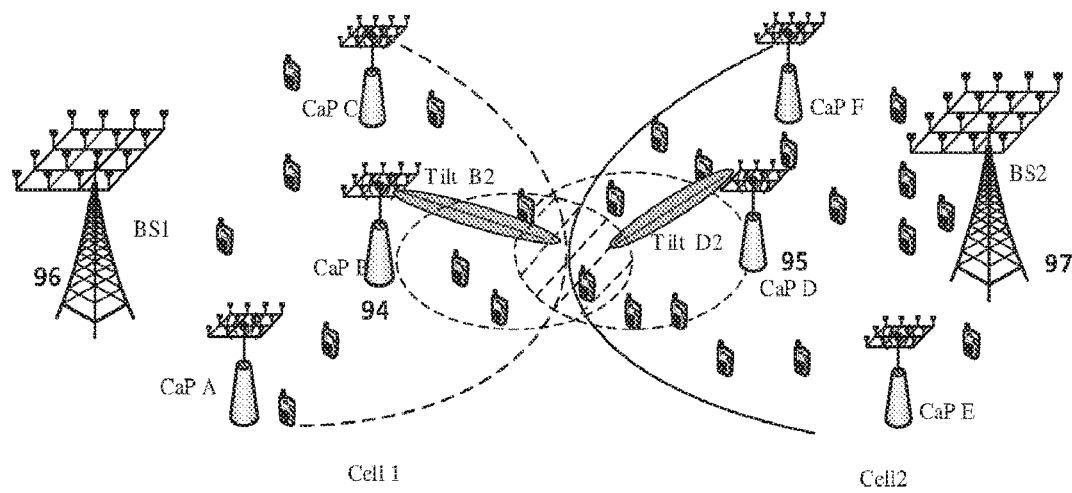

Method I—Interference Coordination:

In one embodiment, the CaPs close to cell edges adjust their antenna down tilts, beam patterns and/or transmission power gains to achieve desired throughput in their own coverage area and to reduce the interference caused to other cells. As illustrated in FIG. 18, BS-1 86 or BS-2 89 or both can initiate a negotiation with the neighboring cell to coordinate the interference if the interference level learned from the feedback from the UEs at the cell edge is larger than a threshold. Alternatively, a radio access controller can initiate the interference coordination based on measurements, estimates or predictions of interference. The involved BSs send control messages to their associated CaPs to adjust the antenna tilts, beam patterns and/or transmission power gains based on predefined optimization criteria, e.g., minimizing interference, maximizing the SINR of target UEs, etc. As illustrated in FIG. 18, after optimization, the antenna tilt of CaP B 87 changes from B1 to B2, the antenna tilt of CaP D 88 changes from D1 to D2, and the power gain of CaP B and CaP D change from pB1 and pD1 to pB2 and pD2 respectively. Note that the optimization of tilt and transmission power gain can be realized in a distributed pattern, e.g., the involved BS-1 and BS-2 calculates them independently according to the exchanged messages from each other, or in a centralized pattern, e.g., the upper layer that manages BSs. This embodiment can be generalized to more than two neighboring cells.

Figure 19:
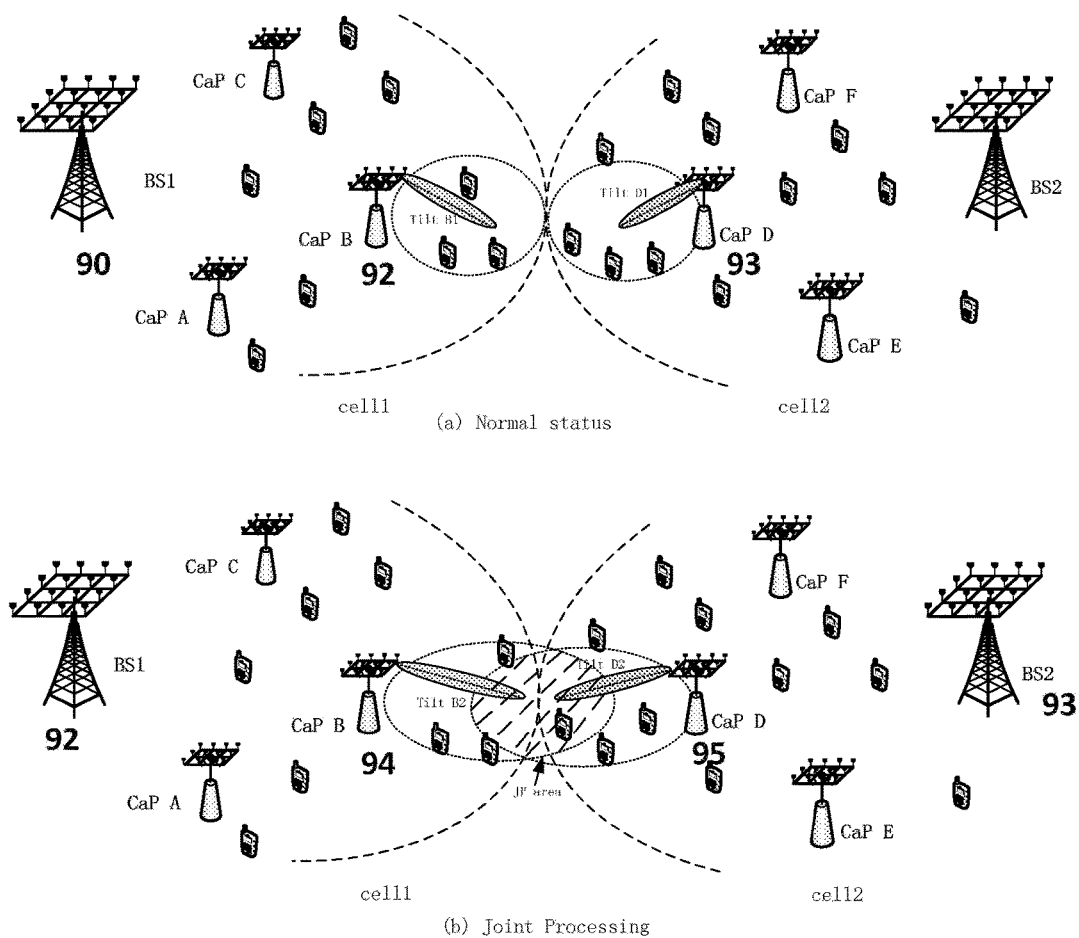
FIG. 19 shows joint processing interference between two neighboring cells.

Method II—Joint Processing:

BSs at neighboring cells cause interference to UEs at cell edge. Another embodiment increases the power gain of CaPs to amplify precoded signals from or to two or more interfering BSs and performs joint processing of the amplified precoded signals at the two or more interfering BSs to enhance the SINR at cell edges, effectively using the CaPs to achieve improved distributed MIMO. In other words, controllable CaPs are used to control the power levels of signals projected into neighboring cells and the signals from neighboring cells are jointly processed to increase the SINR of UEs at cell edges. FIG. 19 shows an example, where CaP B 92 and CaP D 93 are located close to the boundary between Cell-1 and Cell-2. In FIG. 19-(*a*), BS-1 90 and BS-2 91 are in the normal state, i.e., the UE near the boundary is served by BS-1 or BS-2 independently, where the antenna tilt and transmission power gain of CaP B and CaP D are B1, gB1, D1 and gD1 respectively. Either a radio access controller, or BS-1, BS-2 or both can initiate joint processing when it is determined that the SINR level of the UEs near the boundary is lower than a predefined threshold. Then, the two involved BSs reduce the antenna tilts and increase the transmission power gains of their associated CaPs to enlarge the coverage area, i.e., to project coverage further into the neighboring cells, as shown in FIG. 19-(*b*), where the antenna tilts and transmission power gains of CaP B 94 and CaP D 95 are changed to B2, gB2, D2 and gD2 respectively. The values of B2, gB2, D2 and gD2 can be optimized based on specified optimization criteria, e.g., maximizing SINR level of selected one or more UEs at the cell edge. After these adjustments, the UEs in the overlapped coverage area can be more effectively served by joint processing. In other words, they are served by BS-1 92 and BS-2 93 using distributed MU-MIMO. A BS determines which one or several CaPs need to adjust the tilt, beam pattern and/or transmission power gain according to the location of the CaP and the UEs in its coverage. The embodiment can be easily extended to the case of more than two BSs. When UEs not at the cell edges are served, the associated CaPs are re-configured to reduce the coverage area, e.g., increasing antenna tilt angle and decreasing power gain of the CaPs, thus reducing the interference to and/or from neighboring cells.

In another embodiment, a CaP further comprises an interference sensing module that detects in-band interference near the CaP, e.g., by estimating the SINR of the received signal or by listening in a quiet period in which neither UE nor BS are transmitting. Based on the result of the interference detection, the CaP is configured to adjust its gain or on/off to prevent propagation of a local interferer.

Although the foregoing descriptions of the preferred embodiments of the present inventions have shown, described, or illustrated the fundamental novel features or principles of the inventions, it is understood that various omissions, substitutions, and changes in the form of the detail of the methods, elements or apparatuses as illustrated, as well as the uses thereof, may be made by those skilled in the art without departing from the spirit of the present inventions. Hence, the scope of the present inventions should not be limited to the foregoing descriptions. Rather, the principles of the inventions may be applied to a wide range of methods, systems, and apparatuses, to achieve the advantages described herein and to achieve other advantages or to satisfy other objectives as well.

What is claimed is:

1. A controllable Capacity Projector (CaP) supporting an intelligent wireless communication system comprising one or more receiving paths and antennas; one or more transmitting paths and antennas; a work mode, a sleep mode; and a control module, wherein the control module controls the switching between the sleep mode and the work mode and adjusts one or more of transmitting power gain, antenna tilt, beam direction and/or pattern of the transmitter and/or receiver, filtering of the receiving and/or transmitting signal, and provides functions to support one or more modules for intelligent control and management implemented in one or more processors, wherein the one or more modules for intelligent control and management collect information on channel conditions, actual and/or predicted demand for connectivity, data throughput and its distribution for a first time period in the future using signaling and control messages, analyze the collected information to identify the configurations of one or more Base Stations (BSs) and a plural of CaPs that are needed to produce desired communication channels with a plural of User Equipment (UEs) in the first time period to meet the connectivity and data throughput demand and distribution of the connectivity and data throughout demand in the first time period; generate and send corresponding control messages to the plural of CaPs, and adaptively control and configure the plural of CaPs based on the control messages to actively shape the communication channels with a plural of UEs to improve the performance of the spatial multiplexing beamforming between the one or more BSs and the plural UEs to meet the predicted demand and distribution of the connectivity and data throughput, wherein said controlling and configuring the CaP comprises implementing which of the CaPs to switch to the sleep mode or the work mode and adjusting one or more of the transmitting power gain, the antenna tilt, the beam direction and/or the pattern of the transmitter and/or receiver, filtering of the receiving and/or the transmitting signal.

2. The controllable Capacity Projector in claim 1 wherein the control module of the CaP newly introduced into the intelligent wireless communication system carries out a process to register the CaP with a BS, reports the CaPs location or an index of its coverage area to the BS for it to be recorded into the BS's memory, and receives and records a special Connection Identity (CID) sent to it by the BS, wherein the CID for a CaP is distinct from that of a UE.

3. The controllable Capacity Projector in claim 1 wherein the CaP after registering with a BS transmits probe signals at one or more power levels and directions in the uplink, whereas CaPs that are pre-existing in the intelligent wireless communication system and receive the probe signals of the newly registered CaP at sufficient Signal to Noise Ratios (SNRs) or signal strength feed back their CIDs to the BS, the said pre-existing CaPs further transmit uplink or downlink probe signals at one or more directions and power levels using resources allocated by the BS, and the newly registered CaP calculates the SNR or signal strength of the received probe signals of the said pre-existing CaPs, identifies the CIDs of the said pre-existing CaPs whose probe signals are received with sufficient SNR or signal strength and feeds them back to the BS for the BS to identify, record or update multiple-hop paths and the associated hop nodes that avoid loop conditions.

4. The controllable Capacity Projector in claim 1 wherein the CaP measures the signal strength of received uplink signals periodically while in sleep mode and switches into work mode when the measurement is within a specified range and switches into sleep mode when the measurement is outside the specified range, or sends a request to one or more BSs to switch into work mode when the measurement is within a specified range and makes the switch after receiving a control message from a BS consenting to the request.

5. The controllable Capacity Projector in claim 1 wherein the CaP switches into work mode or sleep mode based on downlink control signals it receives from a BS wherein the BS makes the switching decision using information of the locations of the CaP and the UEs that covered by the CaP, the Can M, and the information collected by the one or more modules for intelligent control and management.

6. The controllable Capacity Projector in claim 1 wherein the CaP with multiple transmitting or receiving paths and antennas performs MIMO beamforming using an analog beamforming circuit, or down-converts received signal to the baseband, performs Fast Fourier Transform (FFT) on the received signal and performs MIMO beamforming tuned to sub-carriers.

7. The controllable Capacity Projector in claim 1 wherein the CaP uses a first frequency band for receiving signals and a second frequency band for transmitting signals derived from the received signals.

8. The controllable Capacity Projector in claim 1 further comprises a first circuit path for broadcasting and/or control channel and second circuit path for data channel, wherein the second circuit path for data channel is turned off or put to sleep mode when the CaP has no UEs to serve in its coverage area while the first circuit for the broadcasting and/or control channel stays on.

9. The controllable Capacity Projector in claim 1 wherein the CaP inserts a CaP ID to the signal it transmits to the BS using designated resource elements.

10. The controllable Capacity Projector in claim 1 wherein the CaP broadcasts an identifier (CaP ID) in downlink and receives a feedback from UEs on the CaP ID they receive and optionally forward that information to one or more modules for intelligent control and management for identifying the association of UEs to one or more CaPs, and controlling and configuring the CaPs accordingly.

11. The controllable Capacity Projector in claim 10 wherein the CaP uses a distinct time and/or frequency resource from other CaPs in its neighborhood to broadcast its CaP ID to enable the detection of CaP IDs of multiple CaPs reaching the same UE.

12. The controllable Capacity Projector in claim 1 wherein the CaP communicates with one or more Wireless Positioning Devices (WPD) to detect, localize and identify the presence of UEs in its coverage area via a device-to-device (D2D) communication or machine type communication (MTC) channel, and provides the information to its control module and/or the one or more modules for intelligent control and management to control and configure the CaPs.

13. The controllable Capacity Projector in claim 1 further comprising a small cell mode and the control module switches the CaP to function as a CaP or a small cell based on messages it receives from the one or more modules for intelligent control and management, as a small cell using one frequency band or set of subcarriers and as a CaP using another frequency band or set of subcarriers at the same time.

14. The controllable Capacity Projector in claim 1 further comprising two or more downlink and uplink paths and functions as a CaP simultaneously for two neighboring BSs with a subset of downlink and uplink paths serving a first BS and another subset of downlink and uplink paths serving a second BS.

15. The controllable Capacity Projector in claim 1 wherein the control module lower or increase the gains of the CaP concurrently with one or more other CaPs so that the noise levels from one UE passing through one or more CaPs does not reduce the SNR of another UE, either with or without one or more CaPs in its channel.

16. The controllable Capacity Projector in claim 1 wherein the CaP with multiple transmitting paths obtains the channel estimates between the CaP and one or more UEs and uses the channel estimates to control the parameters of a filter embedded with each transmitting path to ensure when the signals from the multiple transmitting paths of the CaP reach one or more UEs, they add up coherently.

17. The controllable Capacity Projector in claim 1 wherein the CaP supports signaling for a BS to obtain estimates of the channels between the BS and one or more CaPs and the total channels between the BS and a plural of UEs.

18. The controllable Capacity Projector in claim 1 further comprising a positioning module and a mobility module that is capable of traveling under the command of a BS or a module for intelligent control and management, wherein the mobility module moves the CaP to a specified position and orientation in response to the control messages from the one or more modules for intelligent control and management.

19. The controllable Capacity Projector in claim 1 wherein the control module adjusts the antenna down tilts, beam pattern and/or transmission power gain of the CaP to reduce the interference caused by the CaP to one or more neighboring BS's.

20. The controllable Capacity Projector in claim 1 further comprise an interference sensing module, and the CaP is configured in response to the detection of in-band interference near the CaP by the interference sensing module to prevent propagation of a local interferer.

* * * * *